United States Patent
Imamura et al.

(10) Patent No.: US 12,054,111 B2
(45) Date of Patent: Aug. 6, 2024

(54) PROJECTOR CONTROL APPARATUS AND PROJECTOR CONTROL METHOD

(71) Applicant: SONY GROUP CORPORATION, Tokyo (JP)

(72) Inventors: Hiroshi Imamura, Tokyo (JP); Takashi Takamatsu, Tokyo (JP); Seishi Tomonaga, Tokyo (JP); Toru Nagara, Tokyo (JP); Koji Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/008,010

(22) PCT Filed: May 21, 2021

(86) PCT No.: PCT/JP2021/019416
§ 371 (c)(1),
(2) Date: Dec. 2, 2022

(87) PCT Pub. No.: WO2021/256173
PCT Pub. Date: Dec. 23, 2021

(65) Prior Publication Data
US 2023/0234523 A1 Jul. 27, 2023

(30) Foreign Application Priority Data
Jun. 15, 2020 (JP) .................. 2020-102861

(51) Int. Cl.
*B60R 16/037* (2006.01)
*B60Q 3/74* (2017.01)
*B60R 11/00* (2006.01)

(52) U.S. Cl.
CPC .............. *B60R 16/037* (2013.01); *B60Q 3/74* (2017.02); *B60Q 2500/30* (2022.05); *B60R 2011/0028* (2013.01)

(58) Field of Classification Search
CPC .......... B60R 16/037; B60R 2011/0028; B60R 11/02; B60Q 3/74; B60Q 2500/30;
(Continued)

(56) References Cited

U.S. PATENT DOCUMENTS

| 10,434,940 B1 | 10/2019 | Verduzco Ochoa |
| 2002/0029103 A1* | 3/2002 | Breed .................. B60N 2/0244 701/45 |

(Continued)

FOREIGN PATENT DOCUMENTS

| JP | 10-250472 A | 9/1998 |
| JP | 2008-132807 A | 6/2008 |

(Continued)

OTHER PUBLICATIONS

International Search Report and Written Opinion of PCT Application No. PCT/JP2021/019416, issued on Jul. 6, 2021, 09 pages of ISRWO.

*Primary Examiner* — Tsion Tumebo
(74) *Attorney, Agent, or Firm* — CHIP LAW GROUP

(57) ABSTRACT

Provided are an apparatus and a method for analyzing a state of a vehicle occupant and performing illumination and image output control by a projector in units of a screen sectioned area of a vehicle ceiling, in accordance with an analysis result. There is provided a data processing unit configured to execute state analysis of an occupant of a vehicle and execute output control of a projector in accordance with an occupant analysis result. The data processing unit performs projector control of outputting illumination light having luminance determined in accordance with the occupant analysis result, in units of a sectioned area of a screen of a vehicle ceiling on which projector output light is outputted. The data processing unit analyzes a state of an occupant on the basis of a camera-captured image, and outputs illumination light having luminance determined in
(Continued)

accordance with an occupant state, in units of a screen sectioned area above each occupant.

14 Claims, 20 Drawing Sheets

(58) Field of Classification Search
CPC .......... B60Q 3/731; B60Q 3/745; B60Q 3/80; B60W 60/00
See application file for complete search history.

(56) References Cited

U.S. PATENT DOCUMENTS

| | | | | |
|---|---|---|---|---|
| 2003/0125855 | A1* | 7/2003 | Breed | B60R 21/0152 |
| | | | | 701/36 |
| 2007/0262574 | A1* | 11/2007 | Breed | G06V 40/103 |
| | | | | 382/104 |
| 2017/0330044 | A1* | 11/2017 | Telpaz | G05D 1/0088 |
| 2019/0121522 | A1* | 4/2019 | Davis | G06V 40/28 |

FOREIGN PATENT DOCUMENTS

| | | |
|---|---|---|
| JP | 2009-212780 A | 9/2009 |
| JP | 2018-093427 A | 6/2018 |
| JP | 2019-119416 A | 7/2019 |
| JP | 2020-042850 A | 3/2020 |
| WO | 2017/104447 A1 | 6/2017 |

\* cited by examiner

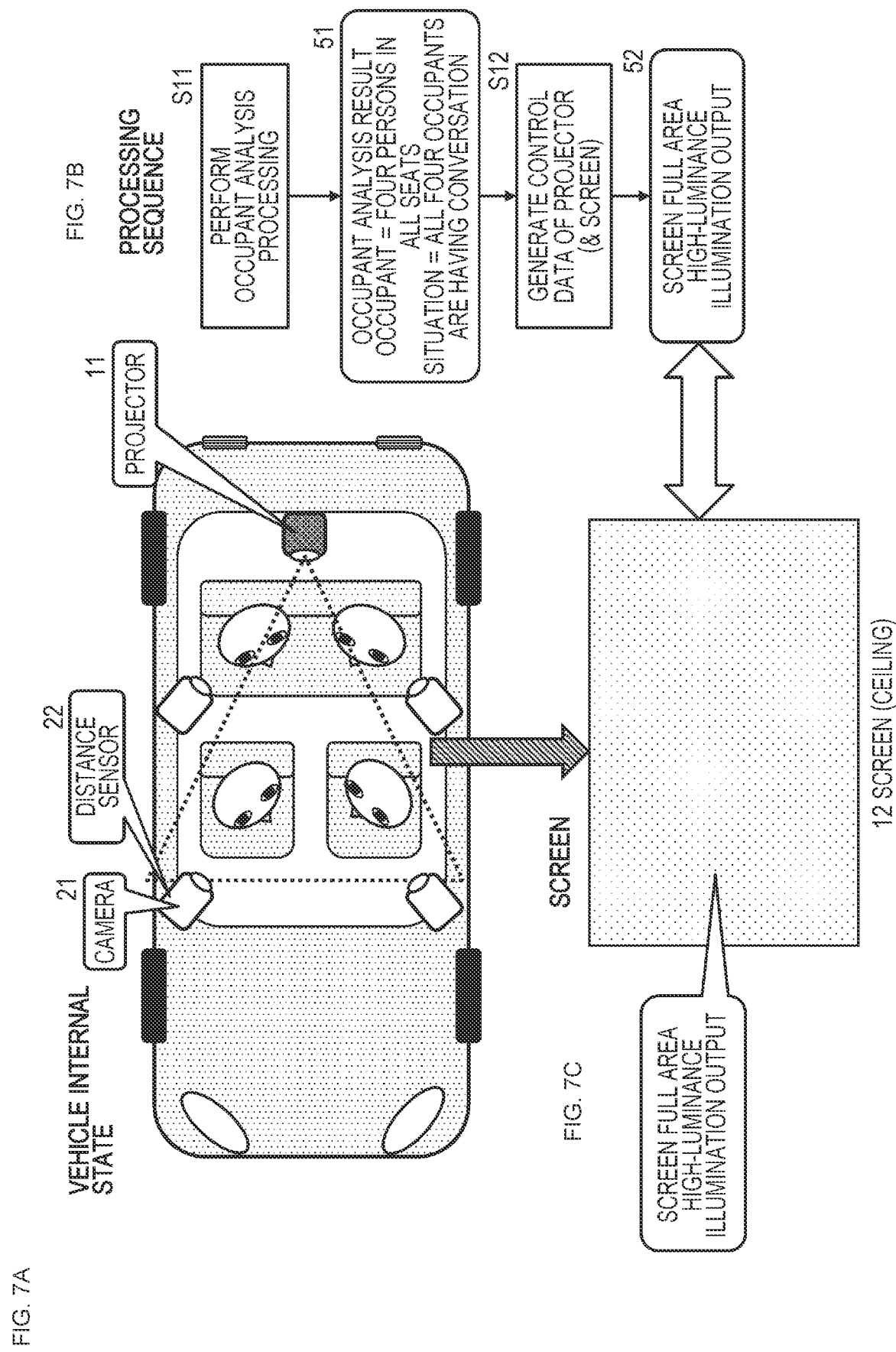

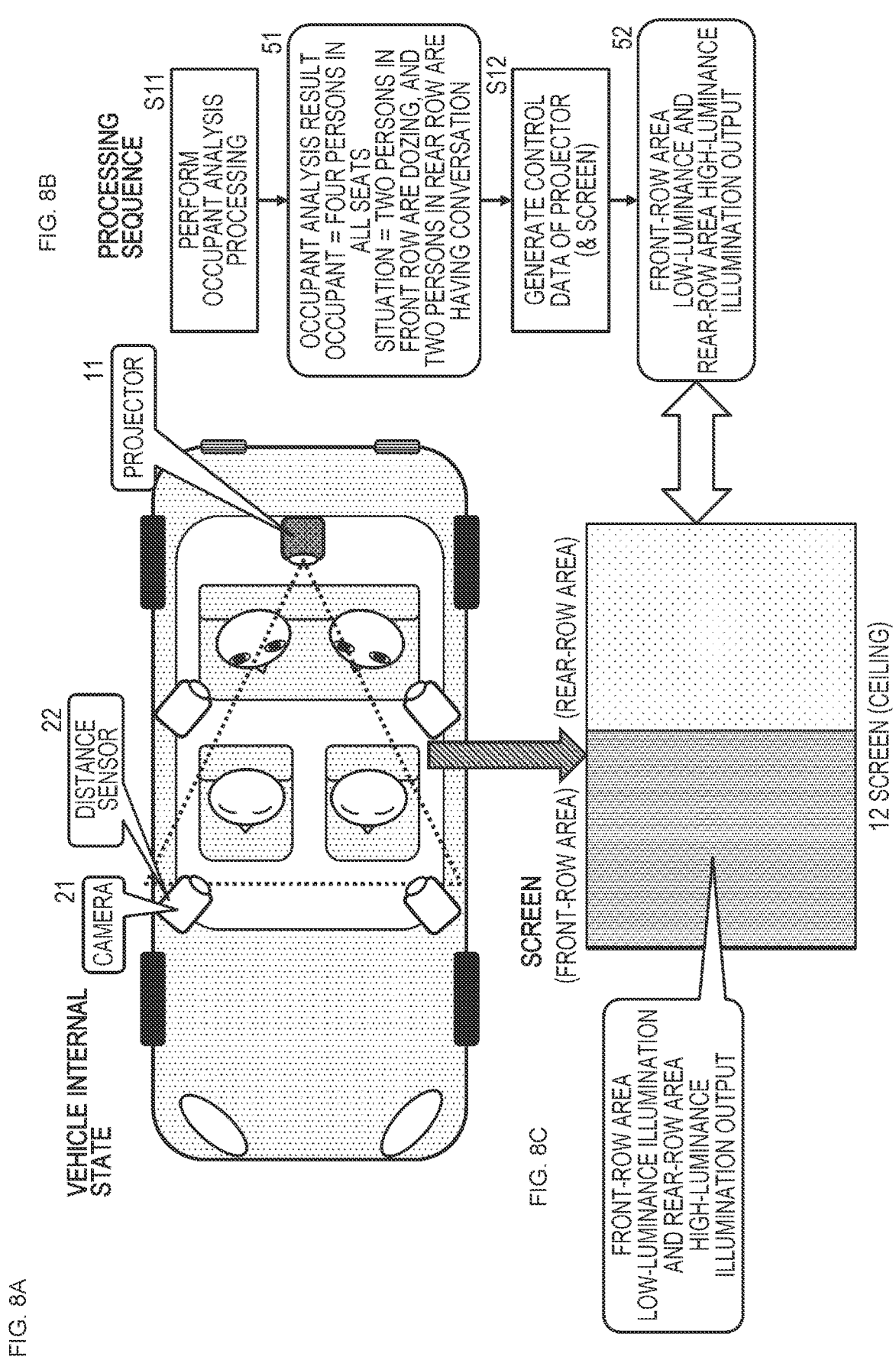

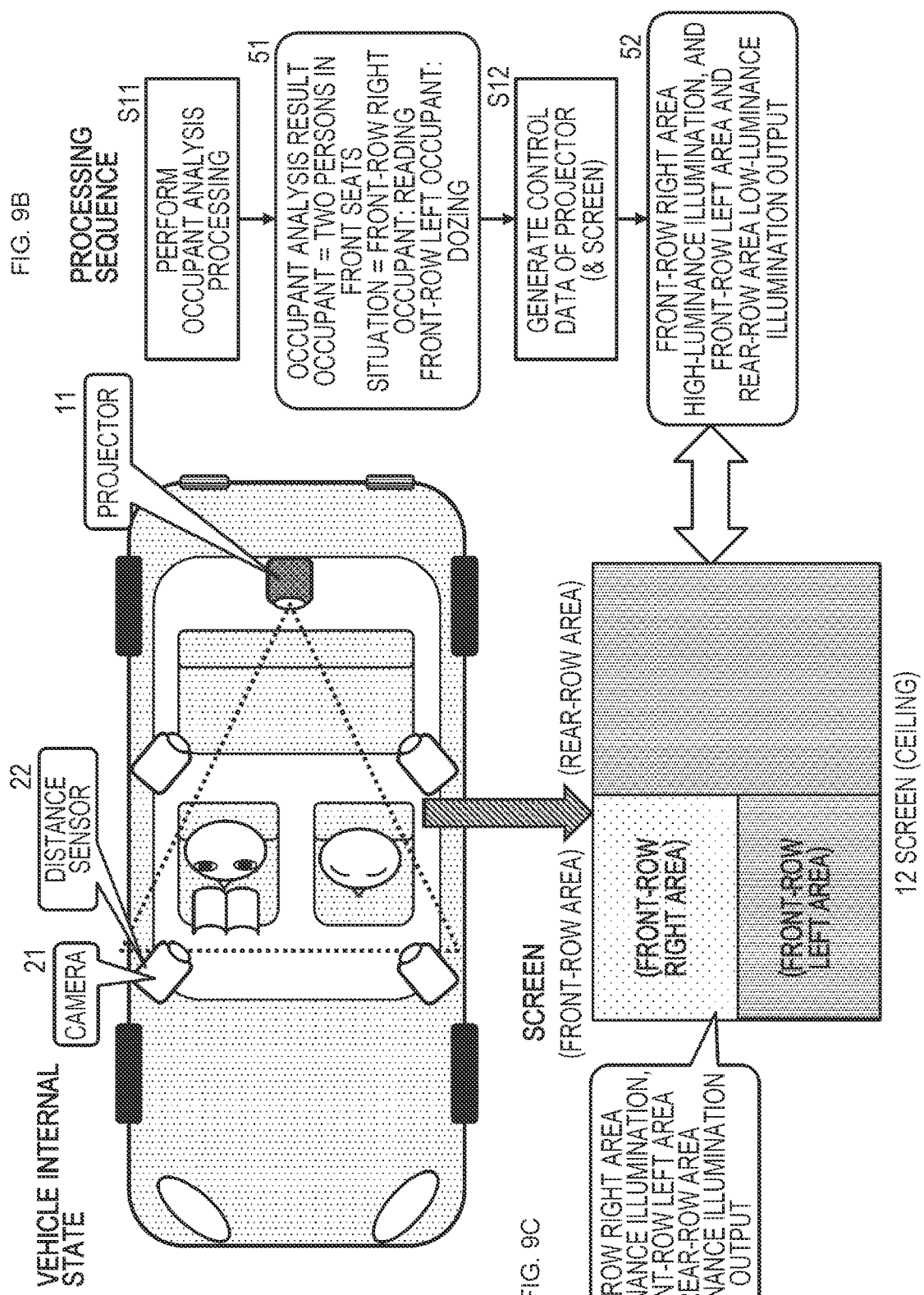

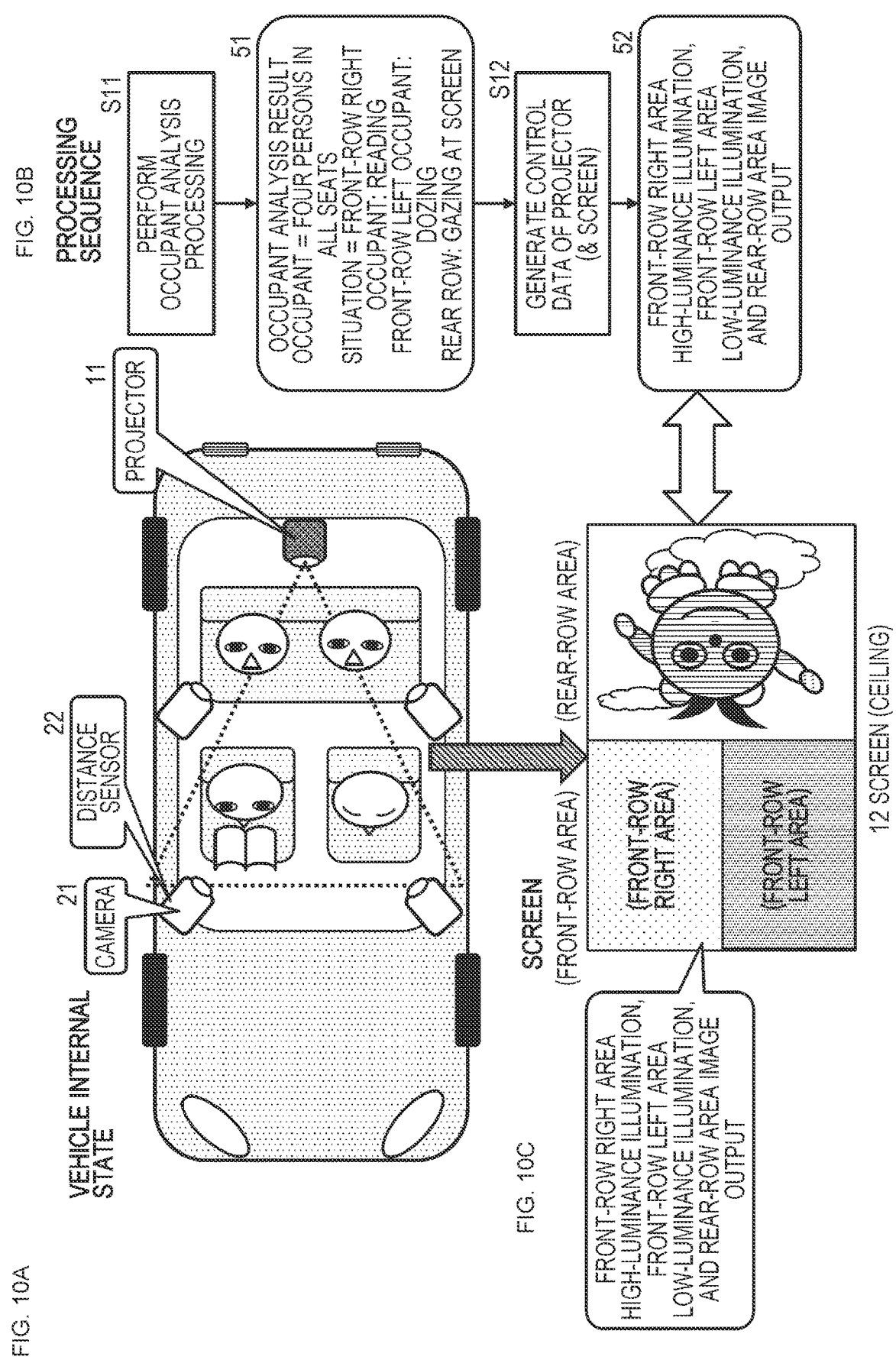

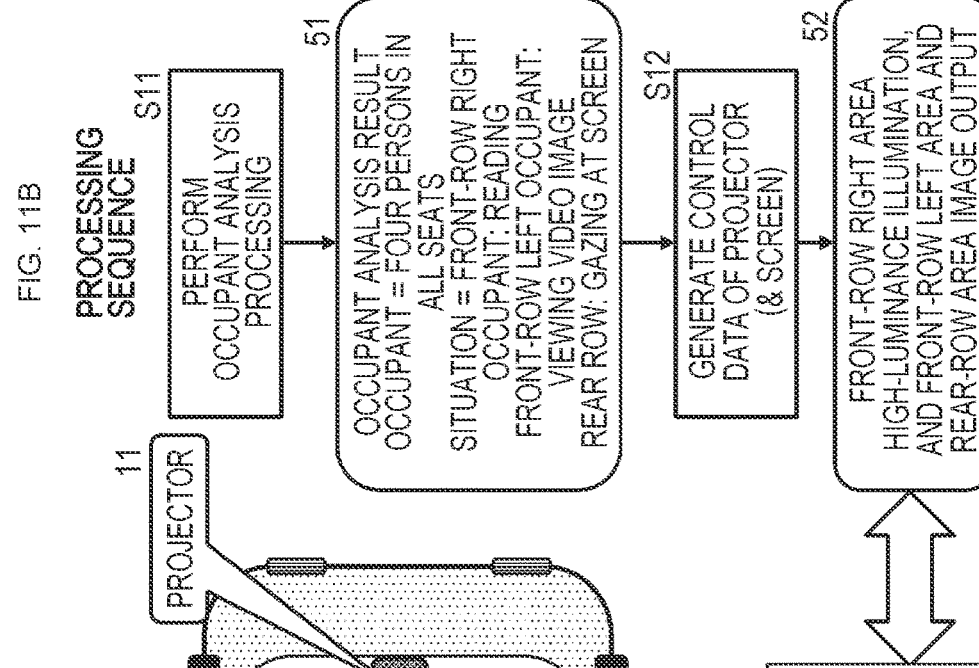
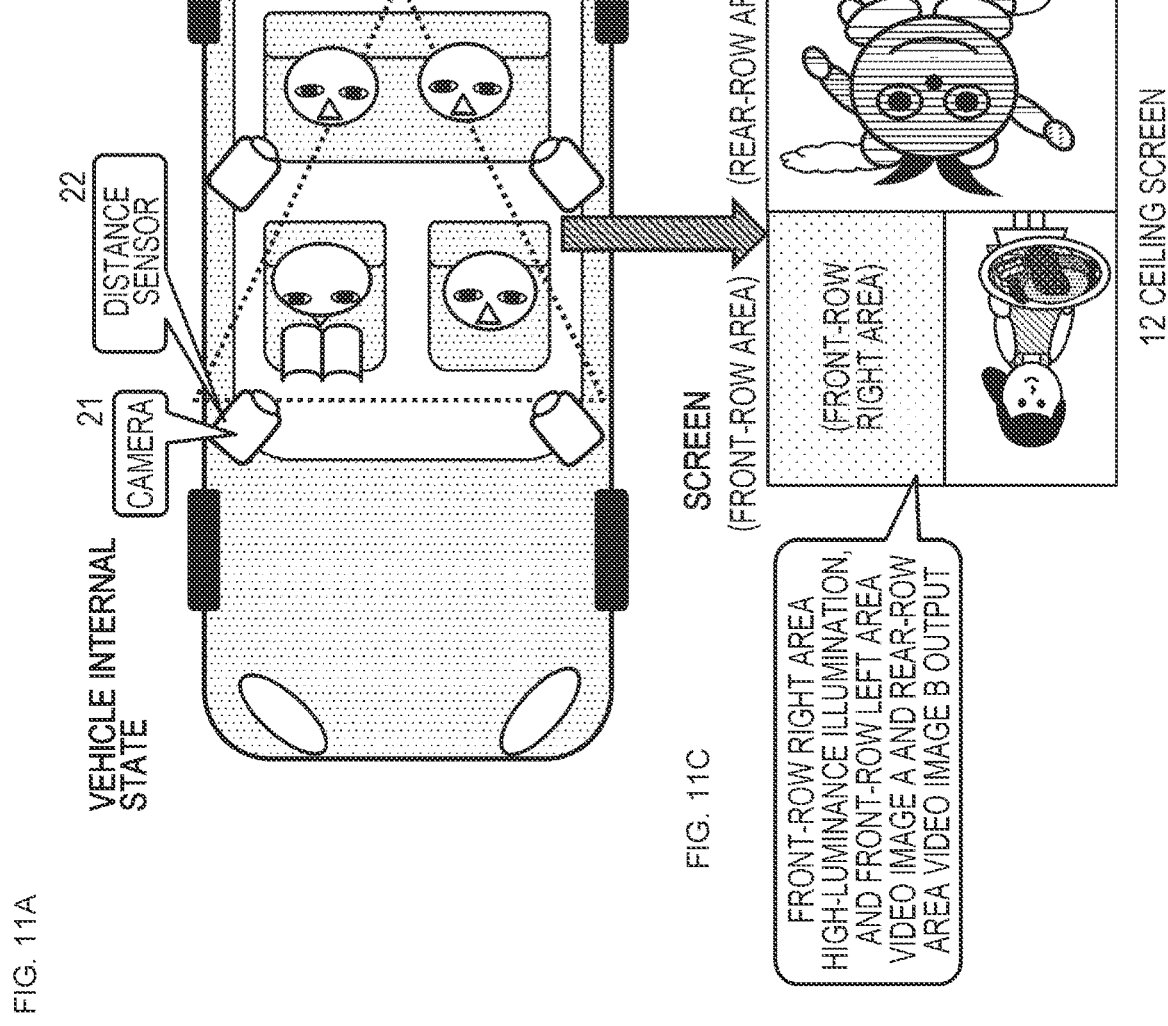

FIG. 13

| | (A) | (B) | (C) | (D) | (E) |
|---|---|---|---|---|---|
| | LOCATION (LATITUDE, LONGITUDE) | TIME | OCCUPANT STATE | PROJECTOR SETTING & SCREEN SETTING | OUTPUT CONTENT |
| (1) | LATITUDE xxx, LONGITUDE yyy | 18:00 | FOUR PERSONS ARE HAVING CONVERSATION | HIGH-LUMINANCE ILLUMINATION | |
| (2) | LATITUDE xxx, LONGITUDE yyy | 21:35 | TWO PERSONS ARE DOZING | LOW-LUMINANCE ILLUMINATION | |
| (3) | LATITUDE xxx, LONGITUDE yyy | 19:10 | FOUR PERSONS ARE GAZING AT SCREEN | CONTENT OUTPUT | ANIMATION CONTENT |
| (4) | LATITUDE xxx, LONGITUDE yyy | ⋮ | ⋮ | ⋮ | ⋮ |
| ⋮ | ⋮ | ⋮ | ⋮ | ⋮ | ⋮ |

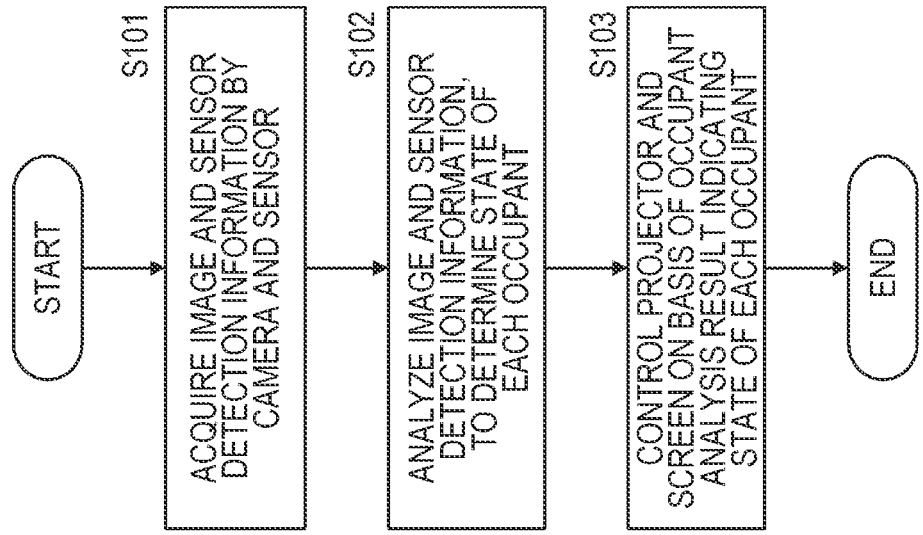

FIG. 15

| | (a) CAMERA ACQUISITION INFORMATION | (b) OCCUPANT STATE DETERMINATION RESULT |
|---|---|---|
| 1 | PLURALITY OF PEOPLE IS MOVING THEIR MOUTHS FACES ARE FACING EACH OTHER | HAVING CONVERSATION |
| 2 | OCCUPANT IS CONTINUOUSLY LOOKING IN DIRECTION OF WINDOW FOR CERTAIN PERIOD OF TIME MOTION IS STATIONARY | LOOKING OUTSIDE WINDOW |
| 3 | MOTION IS STATIONARY FOR CERTAIN PERIOD OF TIME EYES ARE CLOSED, AND ORIENTATION OF FACE IS CONSTANT | ASLEEP, DROWSY, OR FALLING ASLEEP |
| ⋮ | ⋮ | ⋮ |

FIG. 16

| | OCCUPANT STATE | PROJECTOR SETTING & SCREEN SETTING | | AVAILABILITY OF USER SETTING |
|---|---|---|---|---|
| | | ILLUMINATION SETTING | CONTENT OUTPUT | |
| 1 | HAVING CONVERSATION | HIGH-LUMINANCE ILLUMINATION | STOPPED | USER SETTING IS AVAILABLE |
| 2 | SLEEPING | LOW-LUMINANCE ILLUMINATION | STOPPED | USER SETTING IS AVAILABLE |
| 3 | READING | HIGH-LUMINANCE ILLUMINATION | STOPPED | USER SETTING IS AVAILABLE |
| 4 | PLAYING GAME | MEDIUM-LUMINANCE ILLUMINATION | STOPPED | USER SETTING IS AVAILABLE |
| 5 | GAZING FORWARD | MEDIUM-LUMINANCE ILLUMINATION | STOPPED | USER SETTING IS AVAILABLE |
| 6 | GAZING AT SCREEN | STOPPED | CONTENT OUTPUT IS EXECUTED (SELECTABLE BY USER) | USER SETTING IS AVAILABLE |
| ... | ... | ... | ... | ... |

FIG. 17

| | OCCUPANT STATE | PROJECTOR SETTING & SCREEN SETTING | | AVAILABILITY OF USER SETTING |
|---|---|---|---|---|
| | | ILLUMINATION SETTING | CONTENT OUTPUT | |
| 1 | HAVING CONVERSATION | STOPPED | CONTENT OUTPUT IS EXECUTED (SELECTABLE BY USER) | USER SETTING IS AVAILABLE |
| 2 | SLEEPING | STOPPED | STOPPED | USER SETTING IS AVAILABLE |
| 3 | READING | HIGH-LUMINANCE ILLUMINATION | STOPPED | USER SETTING IS AVAILABLE |
| 4 | PLAYING GAME | LOW-LUMINANCE ILLUMINATION | STOPPED | USER SETTING IS AVAILABLE |
| 5 | GAZING FORWARD | STOPPED | STOPPED | USER SETTING IS AVAILABLE |
| 6 | GAZING AT SCREEN | STOPPED | CONTENT OUTPUT IS EXECUTED (SELECTABLE BY USER) | USER SETTING IS AVAILABLE |
| ... | ... | ... | ... | ... |

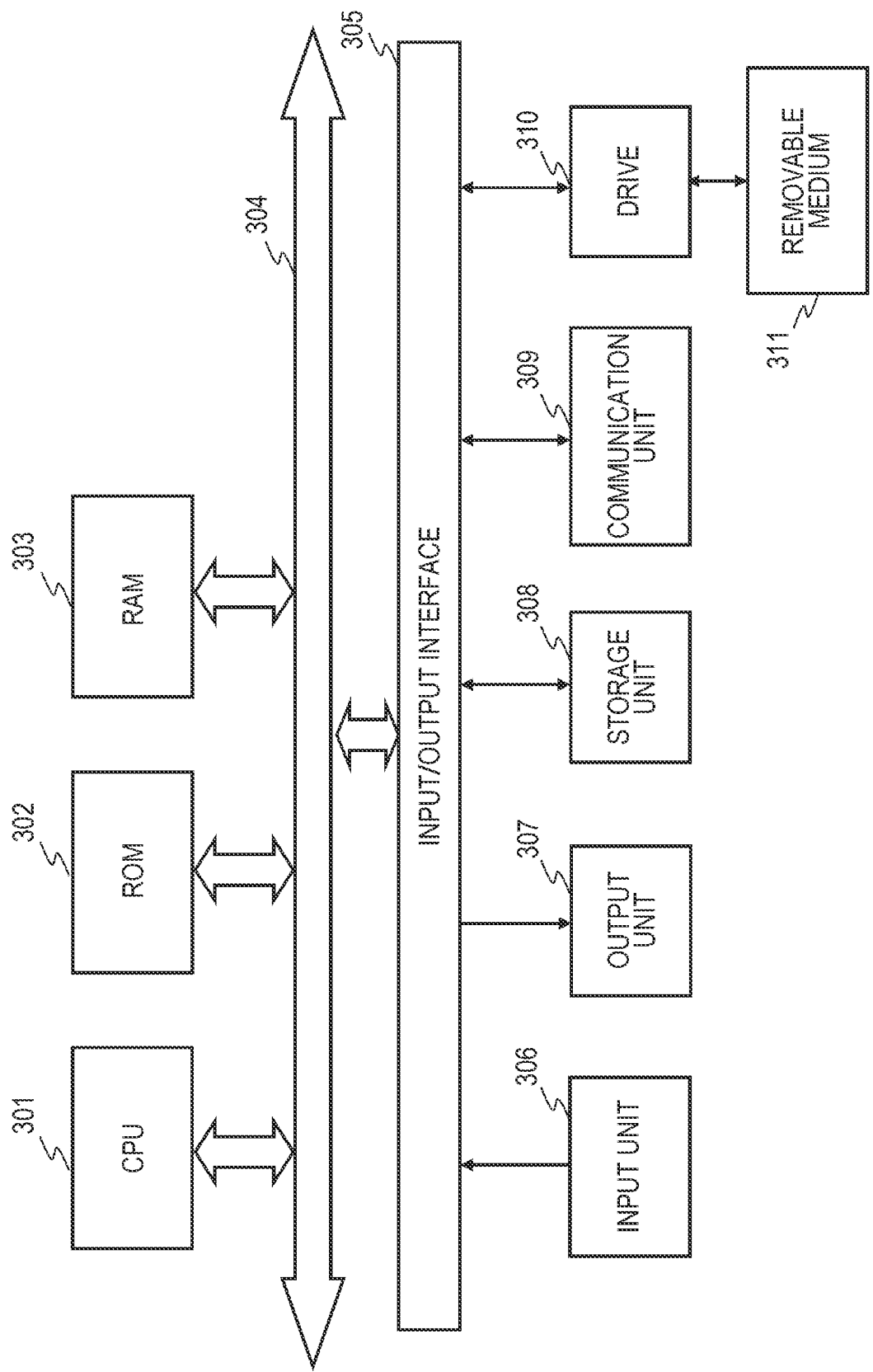

PROJECTOR CONTROL APPARATUS AND PROJECTOR CONTROL METHOD

CROSS REFERENCE TO RELATED APPLICATIONS

This application is a U.S. National Phase of International Patent Application No. PCT/JP2021/019416 filed on May 21, 2021, which claims priority benefit of Japanese Patent Application No. JP 2020-102861 filed in the Japan Patent Office on Jun. 15, 2020. Each of the above-referenced applications is hereby incorporated herein by reference in its entirety.

TECHNICAL FIELD

The present disclosure relates to a projector control apparatus, a projector control method, and a program. More specifically, the present disclosure relates to a projector control apparatus, a projector control method, and a program for controlling emission light from a projector toward a vehicle ceiling.

BACKGROUND ART

In recent years, development of automated vehicles has been accelerated, and it is predicted that a fully automated vehicle that does not require a driving operation by a person will be realized in the future.

In a case of a conventional vehicle that requires a driving operation by a driver, brightening a space in the vehicle disturbs a driving environment of a driver and causes trouble for driving of an oncoming vehicle or the like, so that it has not been tolerated to brighten the vehicle interior illumination.

However, in automated vehicles, it is predicted that such a limitation will be eliminated. When the space inside the vehicle can be made bright and freely used, a user who is an occupant wants to use the space inside the vehicle in the same manner as an own room.

Note that, for example, there is Patent Document 1 (Japanese Patent Application Laid-Open No. 2008-132807) as a conventional technique that discloses a configuration of a lighting device that can be used in a vehicle.

Patent Document 1 discloses a joint lighting device that can be used in a vehicle.

For example, in a case where there is a plurality of occupants in one automated vehicle, it is predicted that the individual occupants take different actions according to their preferences, such as, for example, sleeping, reading, playing a game, or watching a movie.

However, at present, a configuration for performing illumination control and video projection suitable for such actions of individual occupants has not been proposed.

CITATION LIST

Patent Document

Patent Document 1: Japanese Patent Application Laid-Open No. 2008-132807
Patent Document 2: International Publication No. 2017/104447

SUMMARY OF THE INVENTION

Problems to be Solved by the Invention

The present disclosure has been made in view of the problem described above, for example, and an object is to provide a projector control apparatus, a projector control method, and a program capable of optimum illumination control and video projection according to an action or a state of each occupant inside a vehicle.

Solutions to Problems

A first aspect of the present disclosure is
a projector control apparatus including:
a data processing unit configured to execute state analysis of an occupant of a vehicle and execute output control of a projector in accordance with an occupant analysis result, in which
the data processing unit
performs projector control of outputting illumination light having luminance determined in accordance with the occupant analysis result, in units of a sectioned area of a screen of a vehicle ceiling on which projector output light is outputted.

Moreover, a second aspect of the present disclosure is
a projector control method executed in a projector control apparatus, the projector control method including,
by a data processing unit:
an occupant state analysis step of executing state analysis of an occupant of a vehicle; and
a projector control step of executing output control of a projector in accordance with an occupant analysis result, in which
in the projector control step,
projector control of outputting illumination light having luminance determined in accordance with the occupant analysis result is performed in units of a sectioned area of a screen of a vehicle ceiling on which projector output light is outputted.

Moreover, a third aspect of the present disclosure is
a program for causing a projector control apparatus to execute projector control, the program causing a data processing unit to execute:
an occupant state analysis step of controlling to execute state analysis of an occupant of a vehicle; and
a projector control step of controlling to execute output control of a projector in accordance with an occupant analysis result, in which
in the projector control step,
projector control of outputting illumination light having luminance determined in accordance with the occupant analysis result is performed in units of a sectioned area of a screen of a vehicle ceiling on which projector output light is outputted.

Note that the program of the present disclosure is, for example, a program that can be provided by a storage medium or a communication medium that provides a variety of program codes in a computer-readable format, to an information processing apparatus or a computer system capable of executing the program codes. By providing such a program in a computer-readable format, processing corresponding to the program is realized on the information processing apparatus or the computer system.

Still other objects, features, and advantages of the present disclosure will become apparent from the more detailed description based on the embodiment of the present disclosure as described later and the attached drawings. Note that a system in this specification is a logical set configuration of a plurality of devices, and is not limited to one in which a device of each configuration is in a same casing.

A configuration of one embodiment of the present disclosure realizes an apparatus and a method for analyzing a state of a vehicle occupant and executing illumination and image output control by a projector in units of a screen sectioned area of a vehicle ceiling, in accordance with an analysis result.

Specifically, for example, there is provided a data processing unit configured to execute state analysis of an occupant of a vehicle and execute output control of a projector in accordance with an occupant analysis result. The data processing unit performs projector control of outputting illumination light having luminance determined in accordance with the occupant analysis result, in units of a sectioned area of a screen of a vehicle ceiling on which projector output light is outputted. The data processing unit analyzes a state of an occupant on the basis of a camera-captured image, and outputs illumination light having luminance determined in accordance with an occupant state, in units of a screen sectioned area above each occupant.

This configuration realizes an apparatus and a method for analyzing a state of a vehicle occupant and executing illumination and image output control by a projector in units of a screen sectioned area of a vehicle ceiling, in accordance with an analysis result.

Note that the effects described in this specification are merely examples and are not limited, and additional effects may be present.

BRIEF DESCRIPTION OF DRAWINGS

FIGS. 7A, 7B, and 7C are views for explaining a specific example of control of a projector and a screen, based on an analysis result of a state or an action of each vehicle occupant.

FIGS. 8A, 8B, and 8C are views for explaining a specific example of control of the projector and the screen, based on an analysis result of a state or an action of each vehicle occupant.

FIGS. 9A, 9B, and 9C are views for explaining a specific example of control of the projector and the screen, based on an analysis result of a state or an action of each vehicle occupant.

FIGS. 10A, 10B, and 10C are views for explaining a specific example of control of the projector and the screen, based on an analysis result of a state or an action of each vehicle occupant.

FIGS. 11A, 11B, and 11C are views for explaining a specific example of control of the projector and the screen, based on an analysis result of a state or an action of each vehicle occupant.

MODE FOR CARRYING OUT THE INVENTION

Figure 1:
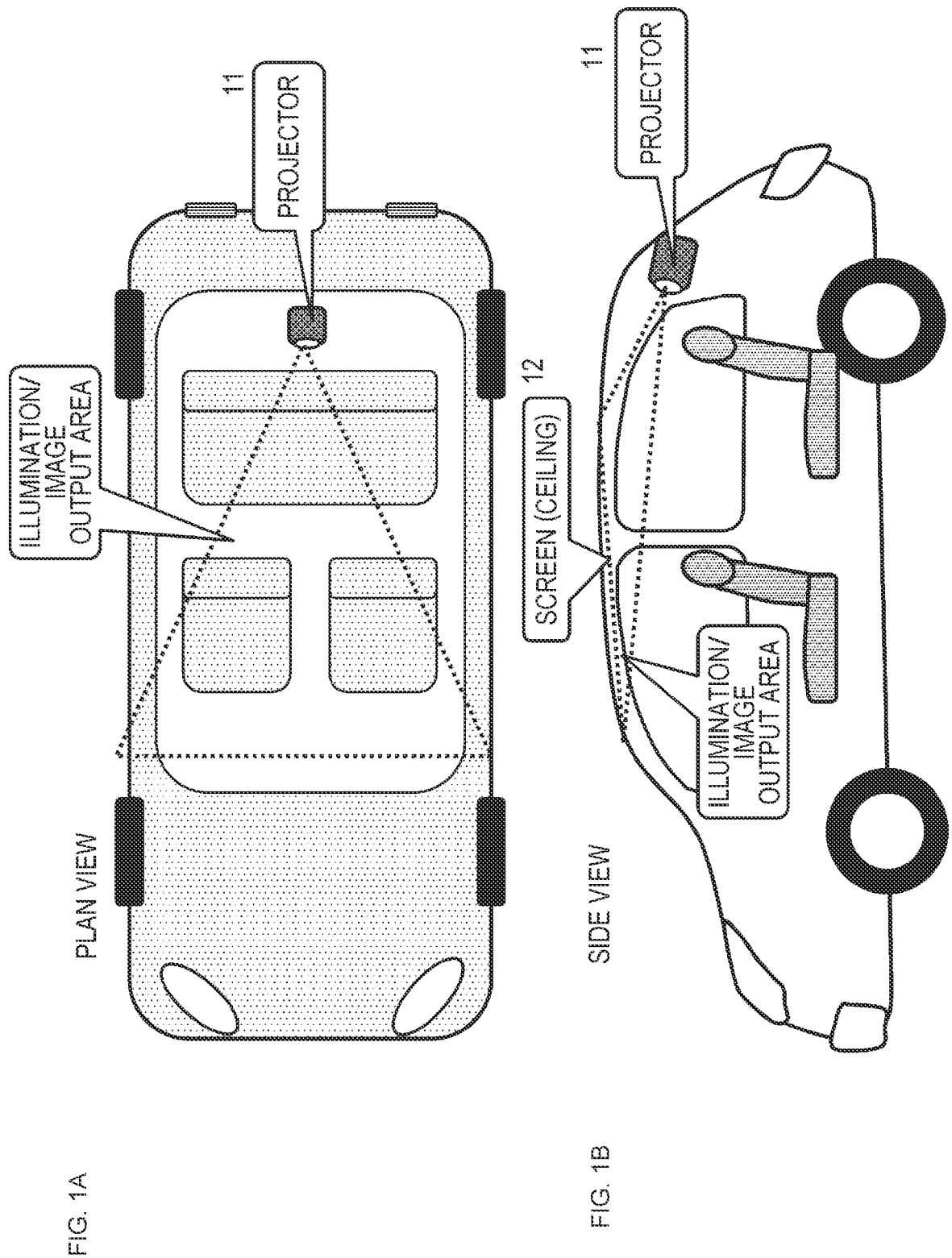
FIGS. 1A and 1B are views for explaining an example of a vehicle equipped with a projector control apparatus of the present disclosure.

Hereinafter, details of a projector control apparatus, a projector control method, and a program of the present disclosure will be described with reference to the figures. Note that the description will be made in accordance with the following items.

1. Outline of projector control apparatus of present disclosure
2. Action and state analysis processing for occupant inside vehicle
3. Specific example of occupant analysis processing and projector control
4. Configuration example of projector control apparatus of present disclosure
5. Sequence of processing executed by projector control apparatus of present disclosure
6. Hardware configuration example of projector control apparatus of present disclosure
7. Summary of configuration of present disclosure

[1. Outline of Projector Control Apparatus of Present Disclosure]

First, an outline of a projector control apparatus according to the present disclosure will be described.

As described above, in an automated vehicle, it is predicted that brightening a space inside the vehicle is tolerated, and a user who is an occupant wants to use the space inside the vehicle in the same manner as an own room.

However, in a case where there is a plurality of occupants in one vehicle, it is predicted that the individual occupants want to take different actions according to their preferences, such as, for example, sleeping, reading, playing a game, or watching a movie.

A projector control apparatus of the present disclosure is capable of performing illumination control and projection control of an image (a still image and a moving image) suitable for such actions of the individual occupants.

The projector control apparatus according to the present disclosure uses a ceiling in the vehicle as a screen, outputs emission light from a projector to the ceiling (the screen), and performs illumination by reflected light from the ceiling (the screen). Moreover, image projection onto the ceiling (the screen) is also performed.

Moreover, the projector control apparatus according to the present disclosure analyzes an action or a state of each occupant inside the vehicle, and realizes provision of an optimum illumination environment and provision of an image (a still image or a moving image) for each occupant, in accordance with an analysis result.

That is, illumination with different brightness, different image output, and the like are executed in units of a divided area of the ceiling (the screen) in the vehicle.

Note that a captured image of a camera and position detection information by a distance sensor or the like are used for analysis processing for an action or a state of each occupant inside the vehicle. Furthermore, the projector control apparatus according to the present disclosure acquires and analyzes not only temporary information such as face information and a position of a person, but also time-series motion information.

FIGS. 1A and 1B are views illustrating an example of a vehicle equipped with a projector control apparatus of the present disclosure.

FIGS. 1A and 1B illustrate FIG. 1A a plan view and FIG. 1B a side view of a vehicle. Note that both are illustrated as cross-sectional views.

The example illustrated in FIGS. 1A and 1B are an example in which one projector 11 is disposed on a back surface of a rear seat of a vehicle.

The projector 11 emits light in a ceiling direction of the vehicle. The ceiling is configured as a screen 12.

Note that the projector 11 may output simple illumination light (white light or the like) or may output an image (a still image or a moving image). In a case where the projector 11 outputs illumination light, reflected light from the screen 12 is used as illumination.

Furthermore, the projector 11 outputs illumination light and an image in units of an observation area (in units of a screen sectioned area) of each occupant of the vehicle. Specific examples of these will be described later.

FIGS. 1A and 1B illustrate an example using one projector 11, but a configuration using a plurality of projectors is also possible.

Figure 2:
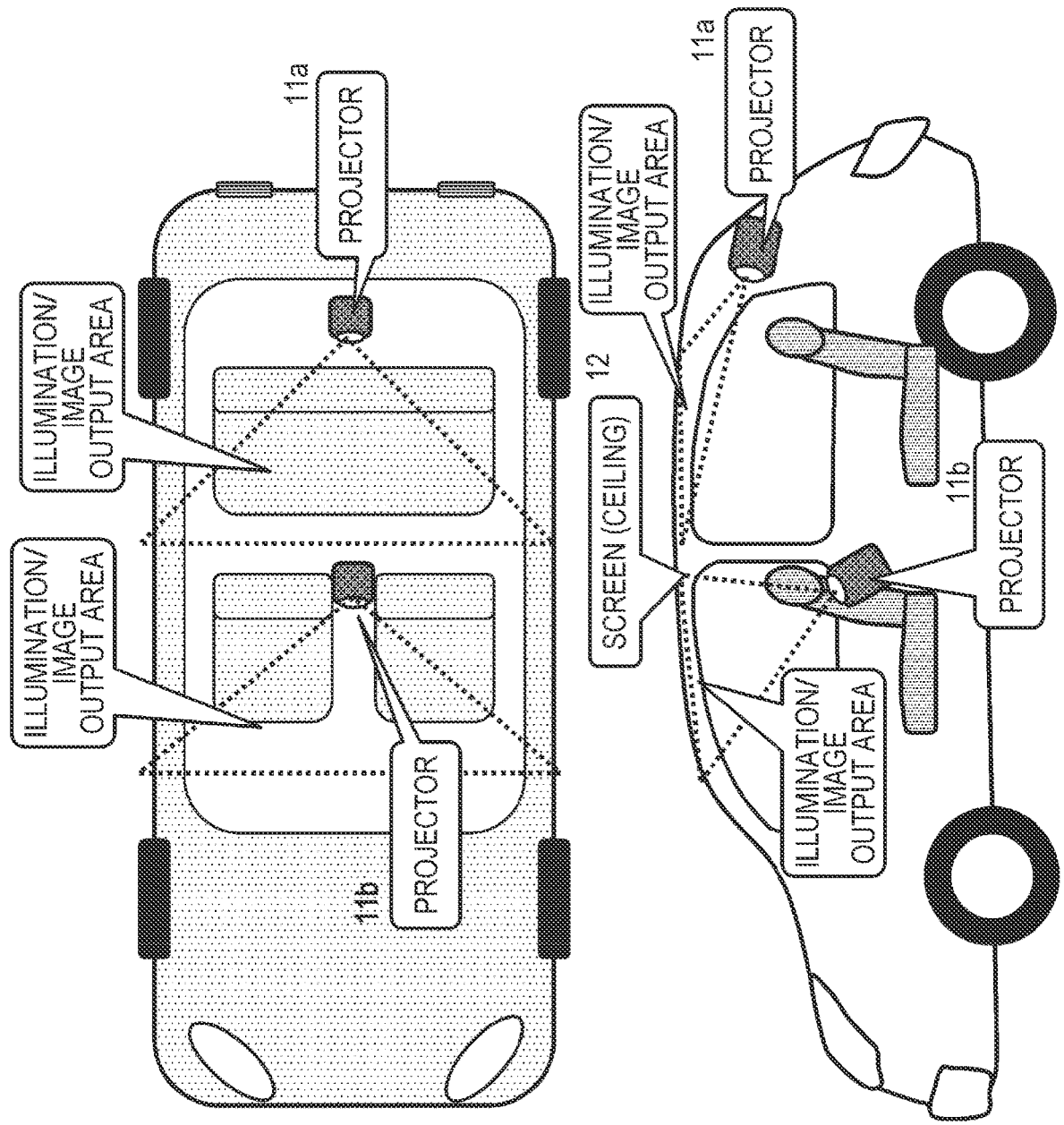
FIG. 2 is a view for explaining an example of a vehicle equipped with the projector control apparatus of the present disclosure.

FIG. 2 illustrates a configuration example using two projectors.

Moreover, the configuration illustrated in FIG. 2 is a configuration in which one projector 11a is disposed on a back surface of a rear seat of the vehicle and another projector 11b is disposed on a back surface of a front seat of the vehicle.

The projector 11a on the back surface of the rear seat mainly outputs illumination light and an image to a vehicle rear area, which is an observation area of an occupant sitting on the rear seat, in the screen 12 on the vehicle ceiling.

Whereas, the projector 11b on the back surface of the front seat mainly outputs illumination light and an image to a vehicle front area, which is an observation area of an occupant sitting on the front seat, in the screen 12 on the vehicle ceiling.

Note that, in an automated vehicle, not only a seat configuration of facing forward of a conventional vehicle but also a seat configuration of facing each other and the like are assumed.

As an installation position, one or a plurality of the projectors 11 is appropriately installed at optimum positions in accordance with the seat configuration.

Furthermore, an output angle of output light from the projector 11 is also set to an optimum angle according to the projector installation position.

Note that, when image projection is performed from an oblique direction, an image on the screen becomes a distorted image. Correction processing for eliminating such image distortion is executed inside the projector 11, and an image is projected. This correction processing makes it possible to display an image without distortion.

Note that such image distortion correction processing is described in, for example, Patent Document 2 (International Publication No. 2017/104447).

The projector 11 according to the present disclosure also performs image projection by internally executing this existing correction processing, for example. This correction processing makes it possible to display an image without distortion.

As described with reference to FIGS. 1A, 1B and 2, a configuration of only one projector 11 and a configuration of using a plurality of projectors 11 are both possible.

As the screen 12, a general screen can also be used. In addition to this, for example, it is possible to user a static functional screen using optical characteristics of a Fresnel lens, a reflective bead, or the like and having a specific reflectance characteristic.

Moreover, a dynamic functional screen capable of adjustment of characteristics of the screen by electrical control, such as a light control film (LCF) or a polymer dispersed liquid crystal (PDLC), may be used.

In a case of using such a dynamic functional screen, processing of controlling characteristics of the screen 12 is additionally executed in accordance with output light of the projector 11.

Specifically, for example, by recognizing a situation of the user by a camera, control is performed to enhance an illumination function by controlling characteristics of the screen, in accordance with a motion of the user, and control is performed to obtain an image that is easy to see from a position of the user.

[2. Action and State Analysis Processing for Occupant Inside Vehicle]

Next, action and state analysis processing for an occupant inside a vehicle will be described.

As described above, the projector control apparatus according to the present disclosure analyzes an action or a state of each occupant inside the vehicle, and realizes processing to provide an optimum illumination environment and provide an image (a still image or a moving image) for each occupant, in accordance with an analysis result.

That is, output of illumination with different brightness, different images (a still image and a moving image), or the like is executed in units of a sectioned area (a divided area) of a ceiling (a screen) in the vehicle.

In order to perform illumination or image output according to a state or an action of an occupant, it is necessary to analyze such an action or a state of the occupant inside the vehicle.

There are various actions and states of occupants inside the vehicle. In a case where there is a plurality of occupants in one vehicle, the individual occupants are in different states, such as different actions, for example, sleeping, reading, playing a game, or watching a movie.

FIGS. 3A, 3B, 3C, 4A, 4B, and 4C illustrate a plurality of examples of different states of occupants of the vehicle.

Figure 3C:
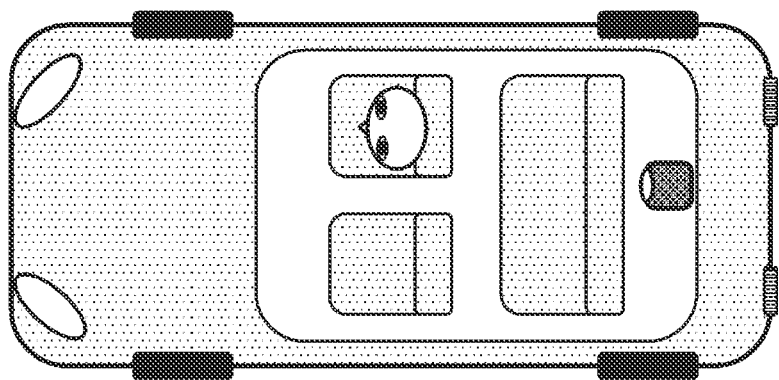
FIGS. 3A, 3B, and 3C are views for explaining a plurality of examples of different states of occupants of a vehicle.
Figure 3B:
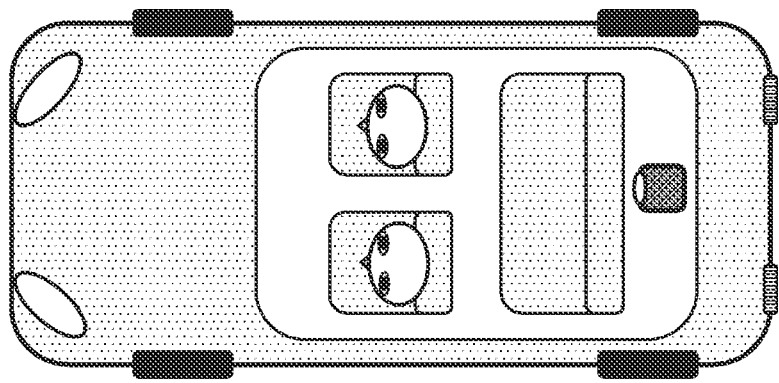
Figure 3A:
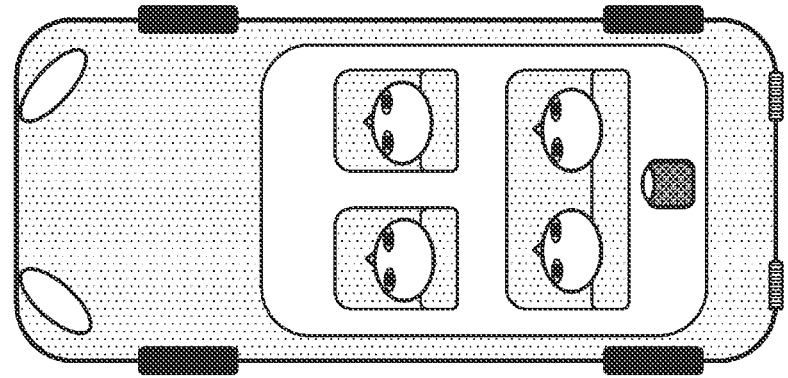

FIG. 3A illustrates a state in which there are a total of four occupants, two in front seats and two in rear seats of the vehicle, and all the occupants are looking forward.

FIG. 3B illustrates a state in which there are two occupants in the front seats of the vehicle and these two occupants are looking forward.

FIG. 3C illustrates a state in which one occupant is in a right front seat of the vehicle and the one occupant is looking forward.

Figure 4C:
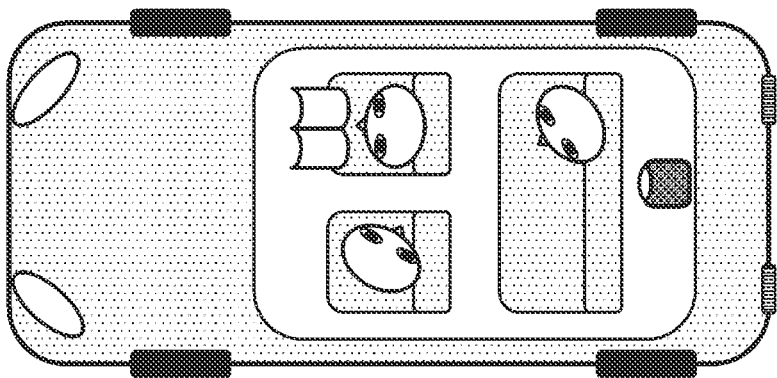
FIGS. 4A, 4B, and 4C are views for explaining a plurality of examples of different states of occupants of a vehicle.
Figure 4B:
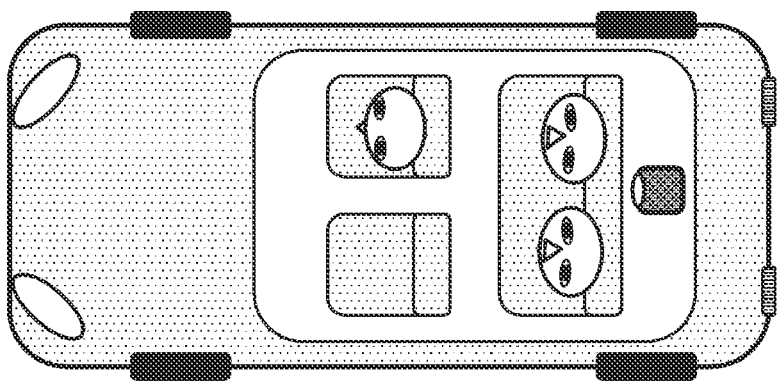
Figure 4A:
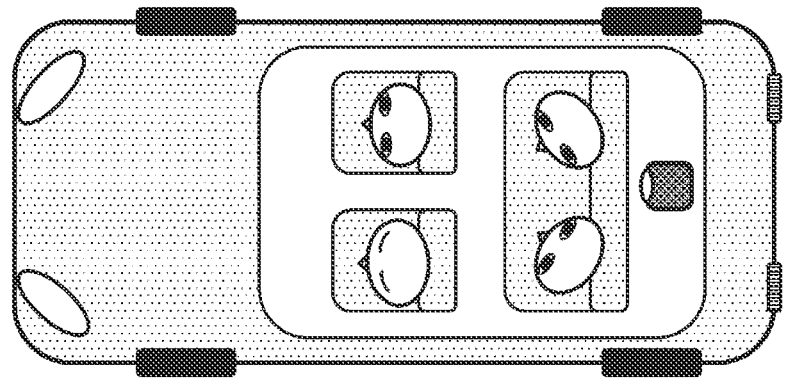

In FIG. 4A, there are four occupants in total, two in the front seats and two in the rear seats of the vehicle, and an occupant in the right front seat of the vehicle is looking forward. An occupant in a left front seat of the vehicle is dozing. Two occupants in the rear seats are having conversation.

In FIG. 4A, one occupant is in the right front seat of the vehicle, and two occupants are in the rear seats. One occupant in the right front seat of the vehicle is looking forward. The two occupants in the rear seats are looking at the screen (the ceiling).

In FIG. 4C, there are two occupants in the front seats of the vehicle and one occupant in a right rear seat. An occupant in the right front seat of the vehicle is reading a book. An occupant in the left front seat of the vehicle and an occupant in the right rear seat are having conversation.

In order to analyze these actions or states of the individual occupants of the vehicle, the projector control apparatus of the present disclosure acquires observation information of the occupants by using a camera and a distance sensor.

Figure 5:
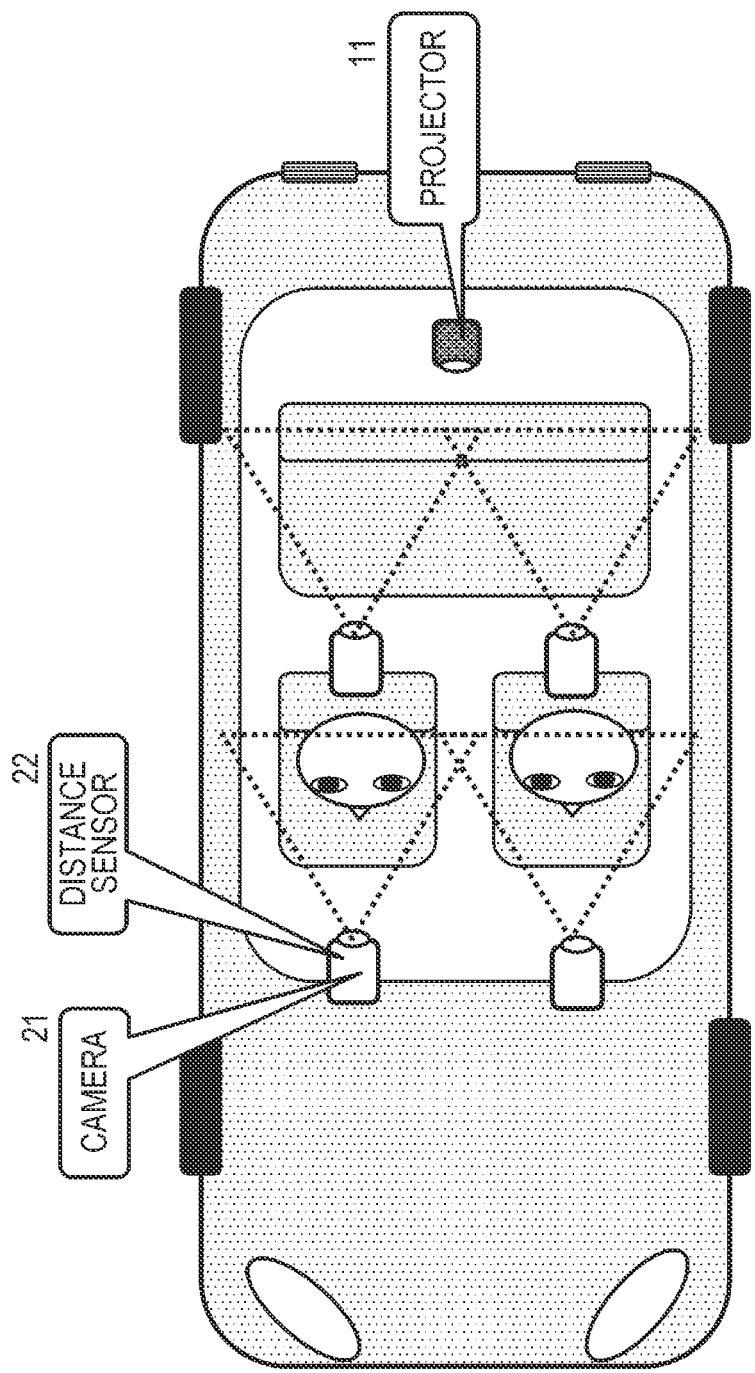
FIG. 5 is a view for explaining an acquisition configuration for observation information of an occupant by using a camera or a distance sensor.

With reference to FIG. 5 and subsequent figures, an acquisition configuration for observation information of an occupant by using a camera and a distance sensor will be described.

FIG. 5 illustrates an example of installation of a camera 21 and a distance sensor 22 of the projector control apparatus of the present disclosure.

A configuration illustrated in FIG. 5 is a configuration in which a plurality of devices in which the camera 21 and the distance sensor 22 are integrated is installed in front of the seat of each occupant.

That is, a device in which the camera 21 and the distance sensor 22 are integrated is installed at four places of the right front seat front, the left front seat front, the right rear seat front, and the left rear seat front of the vehicle.

Images and distance information acquired by these four devices are inputted to a data processing unit of the projector control apparatus.

The data processing unit analyzes the presence or absence of an occupant as to whether or not an occupant is present in each seat. Moreover, the data processing unit analyzes a time-series image (a video image) of the camera 21 and time-series detection information of the distance sensor 22, to execute action analysis processing for each occupant, on an action of each occupant such as, for example, "looking forward", "sleeping", "reading", "playing a game", or "looking at the screen (the ceiling) (watching a movie, or the like)".

The projector control apparatus executes output control of the projector on the basis of an analysis result of each occupant in the data processing unit. Moreover, in a case where the screen is a dynamic functional screen capable of adjustment of characteristics of the screen by electrical control, such as a light control film (LCF) or a polymer dispersed liquid crystal (PDLC), control of the screen is additionally executed.

Figure 6:
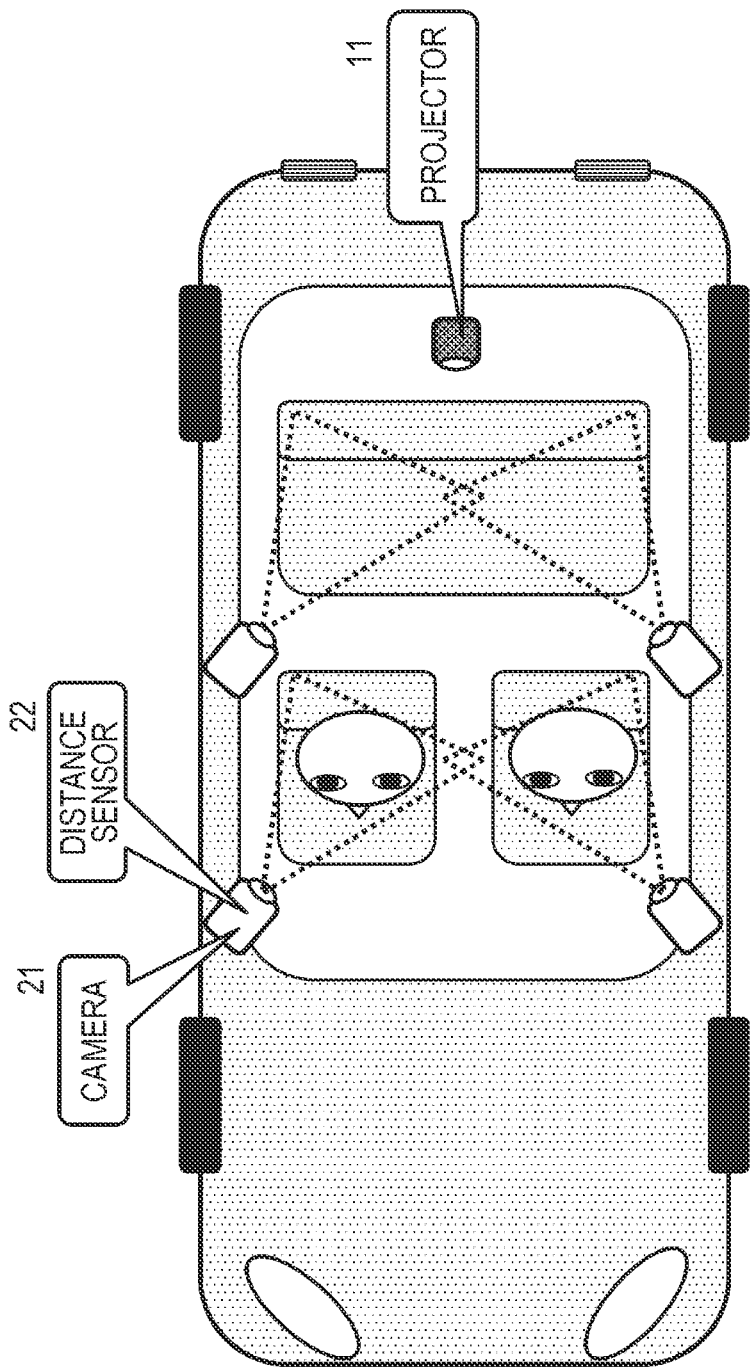
FIG. 6 is a view for explaining an acquisition configuration for observation information of an occupant by using a camera or a distance sensor.

Note that an arrangement configuration of the camera 21 and the distance sensor 22 is not limited to the configuration illustrated in FIG. 5, and for example, as illustrated in FIG. 6, a configuration in which the camera is installed in an oblique direction of each seat is also possible.

Moreover, the number of devices may not be set to the number individually corresponding to individual seats, and it is possible to adopt, for example, a device configuration of two devices including: a device including a camera and a distance sensor that measure an image and a distance of the entire two front seats; and a device including a camera and a distance sensor that measure an image and a distance of the entire rear seat.

Alternatively, a configuration may be adopted in which one omnidirectional camera and a distance sensor are mounted on the vehicle ceiling.

[3. Specific Example of Occupant Analysis Processing and Projector Control]

Next, a specific example of occupant analysis processing and projector control will be described.

As described above, the projector control apparatus of the present disclosure analyzes a state and an action of each vehicle occupant on the basis of a camera-captured image and distance sensor vehicle acquisition information.

Moreover, on the basis of this analysis result, output control of the projector is executed, and control of the screen is additionally executed in a case where the screen is a dynamic functional screen capable of adjustment of characteristics.

Hereinafter, a description will be given to a plurality of specific examples (Control examples 1 to 5) of the control of the projector and the screen based on an analysis result of a state and an action of each vehicle occupant.

(Control example 1)

First, Control example 1 will be described with reference to FIGS. 7A, 7B, and 7C. FIGS. 7A, 7B, and 7C illustrate each of the following figures.

FIG. 7A Vehicle internal state

FIG. 7B Processing sequence (processing executed by data processing unit of projector control apparatus)

FIG. 7C Screen (ceiling) (=projector output state)

FIG. 7A Vehicle internal state indicates a state in which there are occupants in the left and right front seats and the left and right rear seats, and directions of the faces of the occupants face each other.

Note that a state of each occupant can be analyzed by using a captured image of the camera 21 and detection information of the distance sensor 22.

FIG. 7B Processing sequence illustrates a processing sequence executed by the data processing unit of the projector control apparatus.

The processing of each processing step will be described.

(Step S11)

First, the data processing unit of the projector control apparatus executes the occupant analysis processing in step S11.

This processing is executed by inputting a captured image of the camera 21 and detection information of the distance sensor 22.

The data processing unit of the projector control apparatus generates an "occupant analysis result 51" illustrated in FIG. 7B Processing sequence of FIGS. 7A, 7B, and 7C by the occupant analysis processing in step S11.

The "occupant analysis result 51" includes the following data.

Occupant=four persons in all seats

Situation=four occupants are having conversation

Note that the "occupant analysis result 51" also includes position data of each occupant analyzed on the basis of detection information of the distance sensor 22.

(Step S12)

Next, in step S12, the data processing unit of the projector control apparatus generates control data of the projector 11 on the basis of the "occupant analysis result 51" generated in step S11. Note that, in a case where the screen (the ceiling) 12 is a dynamic functional screen capable of adjustment of characteristics of the screen by electrical control, such as a light control film (LCF) or a polymer dispersed liquid crystal (PDLC), control data of the screen is additionally generated.

In accordance with the "occupant analysis result 51" generated as a result of the occupant analysis processing in step S11, the data processing unit of the projector control apparatus generates "projector (& screen) control data 52" for setting an illumination environment or performing image output that are optimum for a current state of the occupant.

In the example illustrated in FIGS. 7A, 7B, and 7C, the data processing unit of the projector control apparatus generates the "projector (& screen) control data 52" as follows.

Projector (& screen) control data 52=screen full area high-luminance illumination output The data processing unit of the projector control apparatus generates the "projector (& screen) control data 52" as described above, and outputs the generated control data to a projector control unit and a screen control unit.

On the basis of the control data generated by the data processing unit, that is, on the basis of control data of Projector (& screen) control data 52=screen full area high-luminance illumination output, the projector control unit and the screen control unit control the projector 11 and the screen 12.

As a result of this control, the screen (the ceiling) 12 is set to a state as illustrated in FIG. 7C.

Specifically, the projector 11 outputs illumination light (white light or the like), and the entire vehicle interior is brightly illuminated by the illumination light (white light or the like) reflected by the screen (the ceiling) 12.

Note that the illumination light output range by the projector 11 of the screen 12 illustrated in FIG. 7C is adjusted in accordance with a position of each occupant analyzed on the basis of detection information of the distance sensor 22.

(Control example 2)

Next, Control example 2 will be described with reference to FIGS. 8A, 8B, and 8C.

Similarly to FIGS. 7A, 7B, and 7C, FIGS. 8A, 8B, and 8C illustrate each of the following figures.

FIG. 8A Vehicle internal state

FIG. 8B Processing sequence (processing executed by data processing unit of projector control apparatus)

FIG. 8C Screen (ceiling) (=projector output state)

FIG. 8A Vehicle internal state is a state in which there are occupants in the left and right front seats and the left and right rear seats, two occupants in the front seats close their eyes, and two occupants in the rear seats are in a state in which directions of the faces of the occupants face each other.

In these occupant states, a state of each occupant can be analyzed by using a captured image of the camera 21 and detection information of the distance sensor 22.

FIG. 8B Processing sequence illustrates a processing sequence executed by the data processing unit of the projector control apparatus.

The processing of each processing step will be described.

(Step S11)

In step S11, the data processing unit of the projector control apparatus inputs a captured image of the camera 21 and detection information of the distance sensor 22, and executes the occupant analysis processing.

The data processing unit generates the "occupant analysis result 51" illustrated in FIG. 8B Processing sequence by the occupant analysis processing.

The "occupant analysis result 51" includes the following data.

Occupant=four persons in all seats

Situation=two persons in the front row are dozing, and two persons in the rear row are having conversation (Step S12)

Next, in step S12, the data processing unit of the projector control apparatus generates control data of the projector 11 on the basis of the "occupant analysis result 51" generated in step S11. Note that, in a case where the screen (the ceiling) 12 is a dynamic functional screen, control data of the screen is additionally generated.

In the example illustrated in FIGS. 8A, 8B, and 8C, the data processing unit of the projector control apparatus generates the "projector (& screen) control data 52" as follows.

Projector (& screen) control data 52=front-row area low-luminance and rear-row area high-luminance illumination output The data processing unit of the projector control apparatus generates the "projector (& screen) control data 52" as described above, and outputs the generated control data to the projector control unit and the screen control unit.

On the basis of the control data generated by the data processing unit, that is, on the basis of control data of Projector (& screen) control data 52=front-row area low-luminance and rear-row area high-luminance illumination output, the projector control unit and the screen control unit control the projector 11 and the screen 12.

As a result of this control, the screen (the ceiling) 12 is set to a state as illustrated in FIG. 8C.

That is, a front-row area of the screen 12, which is an area above the front seat of the vehicle, is set to be in a dark low-luminance illumination light (white light or the like) output state, while a rear-row area of the screen 12, which is an area above the rear seat of the vehicle, is set to be in a bright high-luminance illumination light (white light or the like) output state.

By this processing, a space of the occupants dozing in the front seats of the vehicle is set dark, and a space of the occupants having conversation in the rear seat is set bright.

Note that the sectioned area of the screen 12 illustrated in FIG. 8C is adjusted in accordance with a position of each occupant analyzed on the basis of detection information of the distance sensor 22. This similarly applies to an output range of output light of the projector 11.

(Control example 3)

Next, Control example 3 will be described with reference to FIGS. 9A, 9B, and 9C.

Similarly to FIGS. 7A, 7B, and 7C, FIGS. 9A, 9B, and 9C illustrate each of the following figures.

FIG. 9A Vehicle internal state

FIG. 9B Processing sequence (processing executed by data processing unit of projector control apparatus)

FIG. 9C Screen (ceiling) (=projector output state)

In FIG. 9A Vehicle internal state, there are occupants in the left and right front seats, and an occupant in the right front seat is reading. Furthermore, an occupant in the left front seat closes eyes.

A processing sequence executed by the data processing unit of the projector control apparatus illustrated in FIG. 9B will be described.

The processing of each processing step will be described.

(Step S11)

In step S11, the data processing unit of the projector control apparatus inputs a captured image of the camera 21 and detection information of the distance sensor 22, and executes the occupant analysis processing.

The data processing unit generates the "occupant analysis result 51" illustrated in FIG. 9B Processing sequence by the occupant analysis processing.

The "occupant analysis result 51" includes the following data.

Occupant=two persons in front seats

Situation=the occupant in the right front seat is reading, and the occupant in the left front seat is dozing (Step S12)

Next, in step S12, the data processing unit of the projector control apparatus generates control data of the projector 11 on the basis of the "occupant analysis result 51" generated in step S11. Note that, in a case where the screen (the ceiling) 12 is a dynamic functional screen, control data of the screen is additionally generated.

In the example illustrated in FIGS. 9A, 9B, and 9C, the data processing unit of the projector control apparatus generates the "projector (& screen) control data 52" as follows.

Projector (& screen) control data 52=front-row right area high-luminance and front-row left area and rear-row area low-luminance illumination output The data processing unit of the projector control apparatus generates the "projector (& screen) control data 52" as described above, and outputs the generated control data to the projector control unit and the screen control unit.

On the basis of the control data generated by the data processing unit, that is, on the basis of control data of Projector (& screen) control data 52=front-row right area high-luminance, and front-row left area and rear-row area low-luminance illumination output, the projector control unit and the screen control unit control the projector 11 and the screen 12.

As a result of this control, the screen (the ceiling) 12 is set to a state as illustrated in FIG. 9C.

That is, the front-row right area of the screen 12, which is an area above the front seat of the vehicle, is set to be in a bright high-luminance illumination light (white light or the like) output state, while the front-row left area of the vehicle and the rear-row area of the screen 12, which is an area above the rear seat, is set to be in a dark low-luminance illumination light (white light or the like) output state.

By this processing, a space of the occupant who is reading in the right front seat of the vehicle is set bright, and a space of the occupant who is dozing in the left front seat and the rear seat where there is no occupant are set dark.

Note that, for example, setting may be adopted in which the projector 11 and the screen 12 are controlled such that light reaches only an area of a book in a concentrated manner, in the space of the occupant reading in the right front seat of the vehicle.

Note that, in a case where the screen (the ceiling) 12 is a dynamic functional screen capable of adjustment of characteristics of the screen by electrical control, such as a light control film (LCF) or a polymer dispersed liquid crystal (PDLC), it is also possible to set only a specific selected area to be irradiated with light by controlling the screen.

Note that the sectioned area of the screen 12 illustrated in FIG. 9C is adjusted in accordance with a position of each occupant analyzed on the basis of detection information of the distance sensor 22. This similarly applies to an output range of output light of the projector 11.

(Control example 4)

Next, Control example 4 will be described with reference to FIGS. 10A, 10B, and 10C.

Similarly to FIGS. 7A, 7B, and 7C, FIGS. 10A, 10B, and 10C illustrate each of the following figures.

FIG. 10A Vehicle internal state

FIG. 10B Processing sequence (processing executed by data processing unit of projector control apparatus)

FIG. 10C Screen (ceiling) (=projector output state)

In FIG. 10A Vehicle internal state, there are four occupants in the left and right front seats and the left and right rear seats, and an occupant in the right front seat is reading. Furthermore, an occupant in the left front seat closes eyes, and two occupants in the left and right rear seats are looking at the screen (the ceiling) 12.

A processing sequence executed by the data processing unit of the projector control apparatus illustrated in FIG. 10B will be described.

The processing of each processing step will be described.

(Step S11)

In step S11, the data processing unit of the projector control apparatus inputs a captured image of the camera 21 and detection information of the distance sensor 22, and executes the occupant analysis processing.

The data processing unit generates the "occupant analysis result 51" illustrated in FIG. 10B Processing sequence by the occupant analysis processing.

The "occupant analysis result 51" includes the following data.

Occupant=four persons in all seats

Situation=the occupant in the right front seat is reading, the occupant in the left front seat is dozing, and the assigned occupants in the rear-row seats are gazing at the screen (Step S12)

Next, in step S12, the data processing unit of the projector control apparatus generates control data of the projector 11 on the basis of the "occupant analysis result 51" generated in step S11. Note that, in a case where the screen (the ceiling) 12 is a dynamic functional screen, control data of the screen is additionally generated.

In the example illustrated in FIGS. 9A, 9B, and 9C, the data processing unit of the projector control apparatus generates the "projector (& screen) control data 52" as follows.

Projector (& screen) control data 52=front-row right area high-luminance illumination, front-row left area low-luminance illumination, and rear-row area image output The data processing unit of the projector control apparatus generates the "projector (& screen) control data 52" as described above, and outputs the generated control data to the projector control unit and the screen control unit.

On the basis of the control data generated by the data processing unit, that is, on the basis of control data of Projector (& screen) control data 52=front-row right area high-luminance illumination, front-row left area low-luminance illumination, and rear-row area image output, the projector control unit and the screen control unit control the projector 11 and the screen 12.

As a result of this control, the screen (the ceiling) 12 is set to a state as illustrated in FIG. 10C.

That is, the front-row right area of the screen 12, which is an area above the front seat of the vehicle, is set to be in a bright high-luminance illumination light (white light or the like) output state, the front-row left area of the vehicle is set to be in a dark low-luminance illumination light (white light or the like) output state, and an image, for example, a moving image content is outputted to the rear-row area of the screen 12 which the an area above the rear seat.

Note that the moving image content to be outputted to the rear-row area can be freely selected by a user input to the projector control apparatus.

By this processing, a space of the occupant reading in the right front seat of the vehicle is set bright, a space of the occupant dozing in the left front seat is set to be dark, and an image, for example, a moving image content is displayed on the rear seat side where the occupants looking at the screen 12 are present.

Note that the sectioned area of the screen 12 illustrated in FIG. 10C is adjusted in accordance with a position of each occupant analyzed on the basis of detection information of the distance sensor 22. This similarly applies to an output range of an image and illumination light of the projector 11.

(Control example 5)

Next, Control example 5 will be described with reference to FIGS. 11A, 11B, and 11C.

Similarly to FIGS. 7A, 7B, and 7C, FIGS. 11A, 11B, and 11C illustrate each of the following figures.

FIG. 11A Vehicle internal state

FIG. 11B Processing sequence (processing executed by data processing unit of projector control apparatus)

FIG. 11C Screen (ceiling) (=projector output state)

In FIG. 11A Vehicle internal state, there are four occupants in the left and right front seats and the left and right rear seats, and an occupant in the right front seat is reading. Furthermore, an occupant in the left front seat and two occupants in the left and right rear seats are looking at the screen (the ceiling) 12.

A processing sequence executed by the data processing unit of the projector control apparatus illustrated in FIG. 11B will be described.

The processing of each processing step will be described.

(Step S11)

In step S11, the data processing unit of the projector control apparatus inputs a captured image of the camera 21 and detection information of the distance sensor 22, and executes the occupant analysis processing.

The data processing unit generates the "occupant analysis result 51" illustrated in FIG. 11B Processing sequence by the occupant analysis processing.

The "occupant analysis result 51" includes the following data.

Occupant=four persons in all seats
Situation=the occupant in the right front seat is reading, the occupant in the left front seat and the assigned occupants in the rear-row seats are gazing at the screen (Step S12)

Next, in step S12, the data processing unit of the projector control apparatus generates control data of the projector 11 on the basis of the "occupant analysis result 51" generated in step S11. Note that, in a case where the screen (the ceiling) 12 is a dynamic functional screen, control data of the screen is additionally generated.

In the example illustrated in FIGS. 9A, 9B, and 9C, the data processing unit of the projector control apparatus generates the "projector (& screen) control data 52" as follows.

Projector (& screen) control data 52=front-row right area high-luminance illumination, and front-row left area and rear-row area image output The data processing unit of the projector control apparatus generates the "projector (& screen) control data 52" as described above, and outputs the generated control data to the projector control unit and the screen control unit.

On the basis of the control data generated by the data processing unit, that is, on the basis of control data of Projector (& screen) control data 52=front-row right area high-luminance illumination, and front-row left area and rear-row area image output, the projector control unit and the screen control unit control the projector 11 and the screen 12.

As a result of this control, the screen (the ceiling) 12 is set to a state as illustrated in FIG. 11C, for example.

That is, the front-row right area of the screen 12, which is an area above the front seat of the vehicle, is set to be in a bright high-luminance illumination light (white light or the like) output state, while an image, for example, a moving image content is outputted to the front-row left area of the vehicle and the rear-row area of the screen 12, which are the front-row left area and an area above the rear seat.

Note that, in the example illustrated in FIGS. 11A, 11B, and 11C, the content displayed in the front-row left area of the screen 12 is different from the content displayed in the rear-row area.

These display contents can be set in units of a sectioned area of the screen 12. That is, the setting can be freely performed by a user input to the projector control apparatus.

By this processing, a space of the occupant reading in the right front seat of the vehicle is set bright, an occupant looking at the screen 12 in the left front seat views a moving image content A displayed in the front-row left area of the screen 12, and it is possible to view a content B displayed in the rear-row area of the screen on the rear seat side where the occupant looking at the screen 12 is present.

Note that the sectioned area of the screen 12 illustrated in FIG. 11C is adjusted in accordance with a position of each occupant analyzed on the basis of detection information of the distance sensor 22. This similarly applies to an output range of an image and illumination light of the projector 11.

The plurality of specific examples of control executed by the projector control apparatus of the present disclosure has been described above.

As can be understood from these specific examples, the projector control apparatus of the present disclosure analyzes an action or a state of an occupant using a vehicle, and executes illumination and image display using the screen 12 in units of a sectioned area of the screen 12 on the basis of an analysis result.

By these controls, the occupant inside the vehicle can set an illumination space or can view a content, according to an action or a state of each occupant.

[4. Configuration Example of Projector Control Apparatus of Present Disclosure]

Next, a configuration example of the projector control apparatus of the present disclosure will be described.

Figure 12:
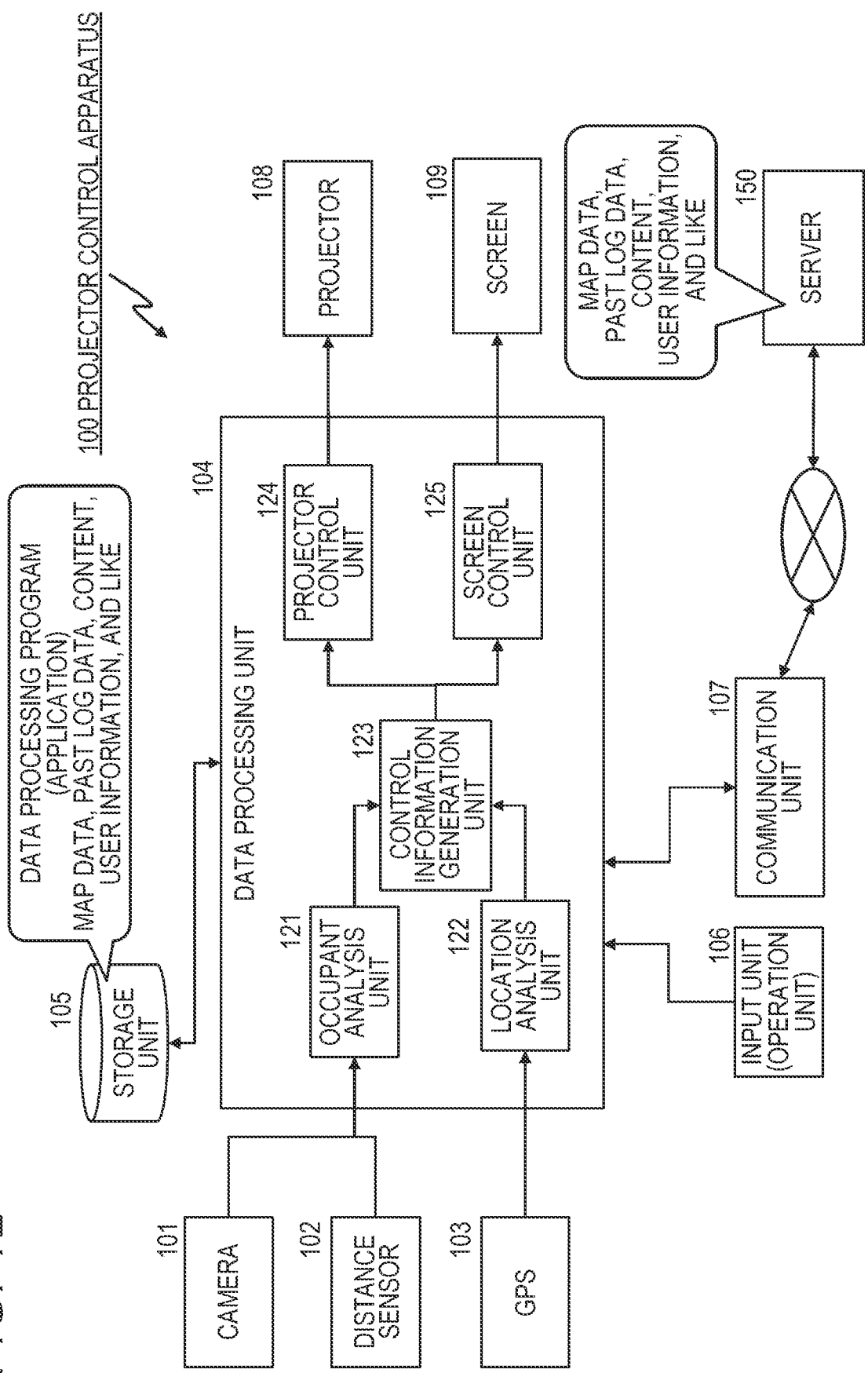

FIG. 12 is a diagram illustrating a configuration example of a projector control apparatus 100 of the present disclosure.

As illustrated in FIG. 12, the projector control apparatus 100 of the present disclosure includes a camera 101, a distance sensor 102, a GPS 103, a data processing unit 104, a storage unit 105, an input unit (an operation unit) 106, a communication unit 107, a projector 108, and a screen 109.

The data processing unit 104 includes an occupant analysis unit 121, a location analysis unit 122, a control information generation unit 123, a projector control unit 124, and a screen control unit 125.

The communication unit 107 executes communication with an external server 150 via a network.

The camera 101 captures an image of an occupant inside the vehicle. A moving image that is time-series image data of an occupant is captured.

The distance sensor 102 continuously measures a distance of an occupant inside the vehicle, and acquires distance observation data for analyzing a motion of the occupant.

Note that, as described above with reference to FIGS. 5 and 6, the camera 101 and the distance sensor 102 are installed at positions where motions and states of all occupants in the vehicle can be observed.

A configuration may be adopted in which a number of cameras and distance sensors corresponding to the number of seats of occupants are installed in the vehicle, or an image of a plurality of occupants is captured by one camera.

Note that a position and motion information of the occupant detected through acquisition information of the distance sensor 102 are used not only for analysis of an action or a state of an occupant, but also used to determine a setting mode of a projection range of an image, an illumination range, or a sectioned area. Determination processing of these is performed in the data processing unit 104.

The GPS 103 executes communication with a GPS satellite to acquire a current location of the vehicle. The acquired location information is inputted to the data processing unit 104.

Although not described in the specific example described above, the projector control apparatus 100 of the present disclosure can also control a projector by using a current location of the vehicle.

This processing will be described later. Specifically, for example, projector setting information at a time of passing through the same position in the past is acquired from a past log, and the projector is controlled on the basis of the acquired past log.

As illustrated in the figure, the data processing unit 104 includes the occupant analysis unit 121, the location analysis unit 122, and the control information generation unit 123.

The occupant analysis unit 121 analyzes a time-series image (a video image) of the camera 101 and time-series detection information of the distance sensor 102, to execute action analysis processing for each occupant, on a state and an action of each occupant such as, for example, "looking forward", "sleeping", "reading", "playing a game", or "looking at the screen (the ceiling) (watching a movie, or the like)".

That is, the processing of step S11 of the processing sequence described above with reference to FIGS. 7A, 7B, 7C, 8A, 8B, 8C, 9A, 9B, 9C, 10A, 10B, 10C, 11A, 11B, 11C, and 12 (Control example 1 to 5) is executed, to generate an occupant analysis result including the presence or absence of an occupant in each seat and data of an action or a state of each occupant.

Moreover, a position of each occupant is analyzed by analyzing detection information of the distance sensor 102. This occupant position information is used to set an output range of projector output light and to set a sectioned area of the screen.

The control information generation unit 123 generates control information of the projector 108 and the screen 109 on the basis of the occupant analysis result generated by the occupant analysis unit 121.

That is, the processing of step S12 of the processing sequence described above with reference to FIGS. 7A, 7B, 7C, 8A, 8B, 8C, 9A, 9B, 9C, 10A, 10B, 10C, 11A, 11B, 11C, and 12 (Control example 1 to 5) is executed.

Control information for performing optimum illumination output and image output in units of a sectioned area of the screen 109 is generated on the basis of the presence or absence of an occupant in each seat and data of an action or a state of each occupant.

The control information includes control information of the projector 108, and also includes screen control information for adjusting screen characteristics determined in accordance with the occupant analysis result in a case where the screen 109 is a dynamic functional screen capable of adjustment of characteristics of the screen by electrical control, such as a light control film (LCF) or a polymer dispersed liquid crystal (PDLC).

Note that, as described above, the control information generation unit 123 sets an output range of output light of the projector 108 and sets a sectioned area of the screen 109, in accordance with the position of each occupant analyzed by the occupant analysis unit 121 on the basis of the detection information of the distance sensor 102.

The projector control information generated by the control information generation unit 123 is outputted to the projector control unit 124.

Furthermore, the screen control information generated by the control information generation unit 123 is outputted to the screen control unit 108.

The projector control unit 124 controls the projector 108 in accordance with control information inputted from the control information generation unit 123.

The screen control unit 125 controls the screen 109 in accordance with control information inputted from the control information generation unit 123.

The projector control unit 124 and the screen control unit 125 execute control processing for performing optimum illumination output and image output in units of a sectioned area of the screen 109 generated by the control information generation unit 123.

The projector control unit 124 controls the projector 108 to perform image output and illumination light output having illuminance determined in accordance with the occupant analysis result and the like, in units of a sectioned area of the screen 109 of the vehicle ceiling on which output light of the projector 108 is outputted.

The screen control unit 125 performs screen control for adjusting screen characteristics determined in accordance with the occupant analysis result, in units of a sectioned area of the screen 109 of the vehicle ceiling on which output light of the projector 108 is outputted.

The location analysis unit 122 in the data processing unit 104 analyzes a current location of the vehicle by using acquisition information of the GPS 103.

The analyzed position data is inputted to the control information generation unit 123. For example, the control information generation unit 123 acquires, from a past log, setting information of the projector and the screen when the projector and the screen have passed through the same position in the past, and generates control information of the projector and the screen on the basis of the acquired past log.

This processing will be described later.

In the storage unit 105, a program (an application) of processing to be executed in the data processing unit 104, map data, past log data, a content such as a moving image to be outputted by the projector 108, and user information such as profile information and a face image of an occupant are recorded.

The data processing unit 104 acquires necessary data from the storage unit 105 as necessary and performs processing. For example, it is also possible to perform collation processing between a face image included in the user information stored in the storage unit 105 and a face image included in a captured image of the camera 101 to specify who the occupant is, and perform user-specific control corresponding to the specified occupant.

Note that, in the past log data stored in the storage unit 105, for example, past user setting information such as, for example, preferred illumination, a content, and the like for each user are recorded. Moreover, operation information and the like associated with map data are also recorded.

A specific example of the past log data stored in the storage unit 105 is illustrated in FIG. 13.

As illustrated in FIG. 13, for example, each piece of the following data is recorded in association with each other in the past log data stored in the storage unit 105.

(A) Location (latitude, longitude)
(B) Time
(C) Occupant state
(D) Projector setting & screen setting
(E) Output content With reference to the past log data, the data processing unit 104 can perform projector control and screen control with settings similar to settings in the past when passing through the same area as that passed in the past.

Note that, without limiting to the storage unit 105, the past log information may be stored in, for example, the external server 150.

The past log information recorded in the storage unit 105 or the external server 150 is data obtained by accumulating user information acquired in time series in accordance with a location where the vehicle is moving, by using map information and GPS information. A usage situation of the video function and the illumination function, movement time, an action in the vehicle, location information, and the like are recorded. On the basis of this log information, a user's preference and a use frequency of the function can be grasped.

For example, it is possible to acquire, from the past log information, information indicating that conversation is active while looking at an outside view at a certain location (an urban area). In this case, it is possible to perform control such as "automatically increasing intensity of the illumination function". Furthermore, it is possible to perform optimization control associated with map information such as "reducing intensity of the illumination function in advance" as there are many cases where an occupant sleeps in a certain section.

The input unit (the operation unit) 106 is an input unit operable by the user, and can perform, for example, setting of illumination, selection designation of an output content, and the like.

The communication unit 107 communicates with the external server 150 via a network such as the Internet.

The server 150 includes, for example, a content providing server, a map information periodic server, a past log accumulation server, a user profile registration server, and the like.

The projector control apparatus 100 can acquire these pieces of data by using either the storage unit 105 in the own device or the external server 150.

[5. Sequence of Processing Executed by Projector Control Apparatus of Present Disclosure]

Next, a sequence of processing executed by the projector control apparatus 100 of the present disclosure will be described.

With reference to flowcharts in and after FIG. 14, a sequence of processing executed by the projector control apparatus 100 of the present disclosure will be described.

Note that the processing according to the flow in and after FIG. 14 is executed under control of a control unit such as a CPU having a program execution function, in accordance with a program stored in the storage unit of the projector control apparatus 100, for example.

Hereinafter, processing of each step of the flow illustrated in FIG. 14 will be sequentially described.

(Step S101)

First, in step S101, the projector control apparatus 100 acquires an image and sensor detection information by a camera and a sensor.

(Step S102)

Next, in step S102, the projector control apparatus 100 analyzes the image and the sensor detection information acquired in step S101, to determine a state of each occupant.

A specific example of occupant state determination processing has been described above with reference to FIGS. 7A, 7B, 7C, 8A, 8B, 8C, 9A, 9B, 9C, 10A, 10B, 10C, 11A, 11B, and 11C.

Note that the occupant state determination processing is executed in the occupant analysis unit 121 of the data processing unit 104 illustrated in FIG. 12.

The occupant analysis unit 121 of the data processing unit 104 illustrated in FIG. 12 analyzes the image and the sensor detection information in accordance with a preset algorithm, to determine a state of each occupant.

An example of a specific determination algorithm will be described with reference to FIG. 15.

An example illustrated in FIG. 15 indicates an example of an occupant state determination algorithm based on a camera-captured image.

For example, on the basis of the camera-captured image, in a case where such a state as "A plurality of people is moving their mouths. Faces are facing each other" is observed, the occupant analysis unit 121 of the data processing unit 104 illustrated in FIG. 12 generates an analysis result indicating that "Occupants are having conversation" as the occupant analysis result.

Furthermore, on the basis of the camera-captured image, in a case where such a state as "An occupant keeps looking at a direction of a window for a certain period of time. The motion is stationary" is observed, the occupant analysis unit 121 generates an analysis result indicating that "An occupant is looking outside the window" as the occupant analysis result.

Moreover, on the basis of the camera-captured image, in a case where such a state as "The motion is stationary for a certain period of time. The eyes are closed, and an orientation of the face is constant" is observed, the occupant analysis unit 121 of the data processing unit 104 illustrated in FIG. 12 generates an analysis result indicating that "An occupant is asleep, drowsy, or falling asleep" as the occupant analysis result.

As described above, in step S102, the occupant analysis unit 121 of the data processing unit 104 illustrated in FIG. 12 determines a state of each occupant in accordance with a preset determination algorithm as illustrated in FIG. 15.

Note that the occupant analysis unit 121 of the data processing unit 104 illustrated in FIG. 12 also analyzes a position of each occupant on the basis of detection information of the distance sensor 102.

This analysis information is used for setting an output range of output light of the projector 108 and setting a sectioned area of the screen 109.

(Step S103)

Finally, in step S103, the projector control apparatus 100 controls the projector 108 and the screen 109 on the basis of the occupant analysis result indicating the state of the occupant determined in step S102.

Specifically, as described above with reference to FIGS. 7A, 7B, 7C, 8A, 8B, 8C, 9A, 9B, 9C, 10A, 10B, 10C, 11A, 11B, and 11C, the control processing of illumination and a content output according to the state of the occupant is performed in units of a sectioned area of the screen 109.

Note that the setting of the output range of the output light of the projector 108 and the setting of the sectioned area of the screen 109 are also adjusted in accordance with a position of each occupant analyzed on the basis of the detection information of the distance sensor 102.

Note that, this control mode can be changed by input processing of the user (the occupant) via the input unit 106.

For example, contents of the content outputted from the projector 108 can be individually set by each occupant. It is also possible to perform setting to output individually different contents above the seats of the occupants as described above with reference to FIGS. 11A, 11B, and 11C.

FIG. 16 illustrates an example of a specific control mode according to an occupant state.

The projector control apparatus 100 of the present disclosure executes control processing according to an occupant state as illustrated in FIG. 16, for example.

A control example illustrated in FIG. 16 is as follows.
(1) Occupant=in a case of having conversation: illumination setting=high-luminance illumination, content output=stopped
(2) Occupant=in case of sleeping: illumination setting=low-luminance illumination, content output=stopped
(3) Occupant=in a case of reading: illumination setting=high-luminance illumination, content output=stopped
(4) Occupant=in a case of playing a game: illumination setting=medium luminance illumination, content output=stopped
(5) Occupant=in a case of gazing forward: illumination setting=medium luminance illumination, content output=stopped
(6) Occupant=in a case of gazing at the screen: illumination setting=stopped, content output=executed Note that these control modes can be changed by a user's input via the input unit 106.

FIG. 17 illustrates a control example changed by a user input.

A control example illustrated in FIG. 17 is as follows.
(1) Occupant=in a case of having conversation: illumination setting=stopped, content output=executed
(2) Occupant=in case of sleeping: illumination setting=stopped, content output=stopped
(3) Occupant=in a case of reading: illumination setting=high-luminance illumination, content output=stopped
(4) Occupant=in a case of playing a game: illumination setting=low-luminance illumination, content output=stopped
(5) Occupant=in a case of gazing forward: illumination setting=stopped, content output=stopped
(6) Occupant=in a case of gazing at the screen: illumination setting=stopped, content output=executed As described above, the control mode executed according to the occupant state can be changed to various settings through an input via the input unit 106 by the user.

Next, with reference to a flowchart illustrated in FIG. 18, a description will be given to a sequence of control processing according to location information of the vehicle acquired by the GPS 103 described above with reference to FIG. 12 and according to the past log information stored in the storage unit 105 or the server 150.

That is, projector setting information recorded in past log information having location information same as or close to the location information of the vehicle acquired by the GPS 103 is acquired from the storage unit 105 or the server 150, and the projector is controlled on the basis of the acquired past log.

Processing of each step in the flow illustrated in FIG. 18 will be described.

(Step S121)

First, in step S121, the projector control apparatus 100 acquires location information, and analyzes a current vehicle location.

This processing is executed by the GPS 103 of the projector control apparatus 100 illustrated in FIG. 12 and the location analysis unit 122 of the data processing unit 104.

(Step S122)

Next, in step S122, the projector control apparatus 100 acquires past log information corresponding to the current vehicle location.

This processing is executed by the control information generation unit 123 of the data processing unit 104 of the projector control apparatus 100 illustrated in FIG. 12.

The control information generation unit 123 acquires, from the storage unit 105 or the server 150, past log information having location information same as or close to the current vehicle location analyzed by the location analysis unit 122.

Note that, as described above with reference to FIG. 13, for example, each piece of the following data is recorded in association with each other in the past log information.
(A) Location (latitude, longitude)
(B) Time
(C) Occupant state
(D) Projector setting & screen setting
(E) Output content (Step S123)

Next, in step S123, on the basis of the projector setting information and the screen setting information recorded in the past log information corresponding to the current vehicle location acquired in step S122, the projector control apparatus 100 performs control to achieve the same settings as these.

As described above, the past log information recorded in the storage unit 105 or the external server 150 is data obtained by accumulating user information acquired in time series in accordance with a location where the vehicle is moving, by using map information and GPS information. A usage situation of the video function and the illumination function, movement time, an action in the vehicle, location information, and the like are recorded. On the basis of this log information, a user's preference and a use frequency of the function can be grasped.

Figure 18:
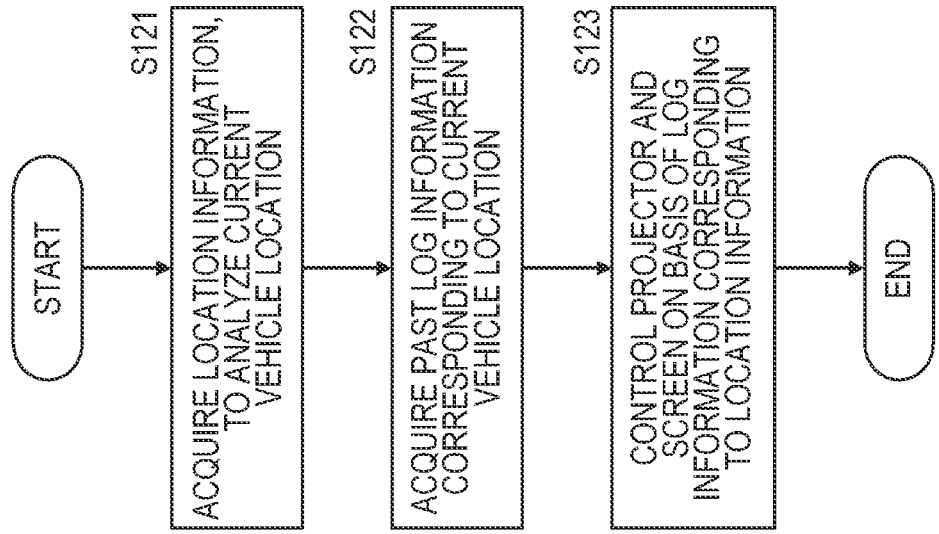

As a specific example of the control processing according to the flow illustrated in FIG. 18, for example, there is a control example of acquiring, from the past log information, information indicating that conversation is active while looking at an outside view at a certain location (an urban area), and "automatically increasing intensity of the illumination function" when the vehicle passes through an urban area on the basis of the past log information.

Furthermore, in a case where a past log is detected indicating that there are many cases where an occupant sleeps in a certain section, it is also possible to perform control such as "reducing intensity of the illumination function in advance".

Note that, a configuration may be adopted in which, in a case of performing the projector and screen control using the past log information, the processing is performed further in consideration of a matching degree between current time and time recorded in the past log information.

Moreover, a configuration may be adopted in which collation processing is performed on the face of an occupant included in a captured image by the camera 101 with a face image of a user registered in the storage unit 105 or the server 150 to specify an occupant (a user) currently in a vehicle, and the same control as the control mode registered in the past log information is performed only in a case where the specified user is the user corresponding to a user ID recorded in the past log information.

By performing such control, it is possible to perform user-specific control according to a preference of the specified user.

The control processing illustrated in FIG. 18 to which the past log information is applied and the control processing based on an action or a state of an occupant described above with reference to FIG. 14 can be executed together.

This processing sequence will be described with reference to the flowchart illustrated in FIG. 19.

Processing of each step in the flow illustrated in FIG. 19 will be described.

(Step S141)

First, in step S141, the projector control apparatus 100 acquires location information, and analyzes a current vehicle location.

This processing is executed by the GPS 103 of the projector control apparatus 100 illustrated in FIG. 12 and the location analysis unit 122 of the data processing unit 104.

(Steps S142 and S143)

Next, in steps S142 and S143, the projector control apparatus 100 searches the storage unit 105 or the server 150, and determines whether or not past log information corresponding to the current vehicle location is registered in the storage unit 105 or the server 150.

This processing is executed by the control information generation unit 123 of the data processing unit 104 of the projector control apparatus 100 illustrated in FIG. 12.

In a case where it is determined that the past log information corresponding to the current vehicle location is registered in the storage unit 105 or the server 150, the processing proceeds to step S144.

Whereas, in a case where it is determined that the past log information corresponding to the current vehicle location is not registered in the storage unit 105 or the server 150, the processing proceeds to step S145.

(Step S144)

The past log information corresponding to the current vehicle location proceeds to execute the processing below.

In step S144, on the basis of the projector setting information and the screen setting information recorded in the past log information corresponding to the current vehicle location acquired in step S142, the projector control apparatus 100 performs control to achieve the same settings as these.

(Step S145)

Whereas, in a case where it is determined that the past log information corresponding to the current vehicle location is not registered in the storage unit 105 or the server 150, the processing proceeds to step S145 and the following processing is executed.

In step S145, the projector control apparatus 100 acquires an image and sensor detection information by a camera and a sensor.

(Step S146)

Next, in step S146, the projector control apparatus 100 analyzes the image and the sensor detection information acquired in step S145, to determine a state of each occupant.

A specific example of the occupant state determination processing has been described above with reference to FIGS. 7A, 7B, 7C, 8A, 8B, 8C, 9A, 9B, 9C, 10A, 10B, 10C, 11A, 11B, and 11C.

Note that the occupant state determination processing is executed in the occupant analysis unit 121 of the data processing unit 104 illustrated in FIG. 12.

The occupant analysis unit 121 of the data processing unit 104 illustrated in FIG. 12 analyzes the image and the sensor detection information in accordance with a preset algorithm, to determine a state of each occupant.

(Step S147)

Finally, in step S147, the projector control apparatus 100 controls the projector 108 and the screen 109 on the basis of the occupant analysis result indicating the state of the occupant determined in step S146.

Specifically, as described above with reference to FIGS. 7A, 7B, 7C, 8A, 8B, 8C, 9A, 9B, 9C, 10A, 10B, 10C, 11A, 11B, and 11C, the control processing of illumination and a content output according to the state of the occupant is performed in units of a sectioned area of the screen 109.

Note that the setting of the output range of the output light of the projector 108 and the setting of the sectioned area of the screen 109 are also adjusted in accordance with a position of each occupant analyzed on the basis of the detection information of the distance sensor 102.

Note that, this control mode can be changed by input processing of the user (the occupant) via the input unit 106.

For example, contents of the content outputted from the projector 108 can be individually set by each occupant. It is also possible to perform setting to output individually different contents above the seats of the occupants as described above with reference to FIGS. 11A, 11B, and 11C.

Furthermore, in the projector and screen control using the past log information executed in step S144, a configuration may be adopted in which processing is performed further in consideration of a matching degree between current time and time recorded in the past log information as described above, or in which control processing specific to the user is performed using a user identification result.

Figure 19:
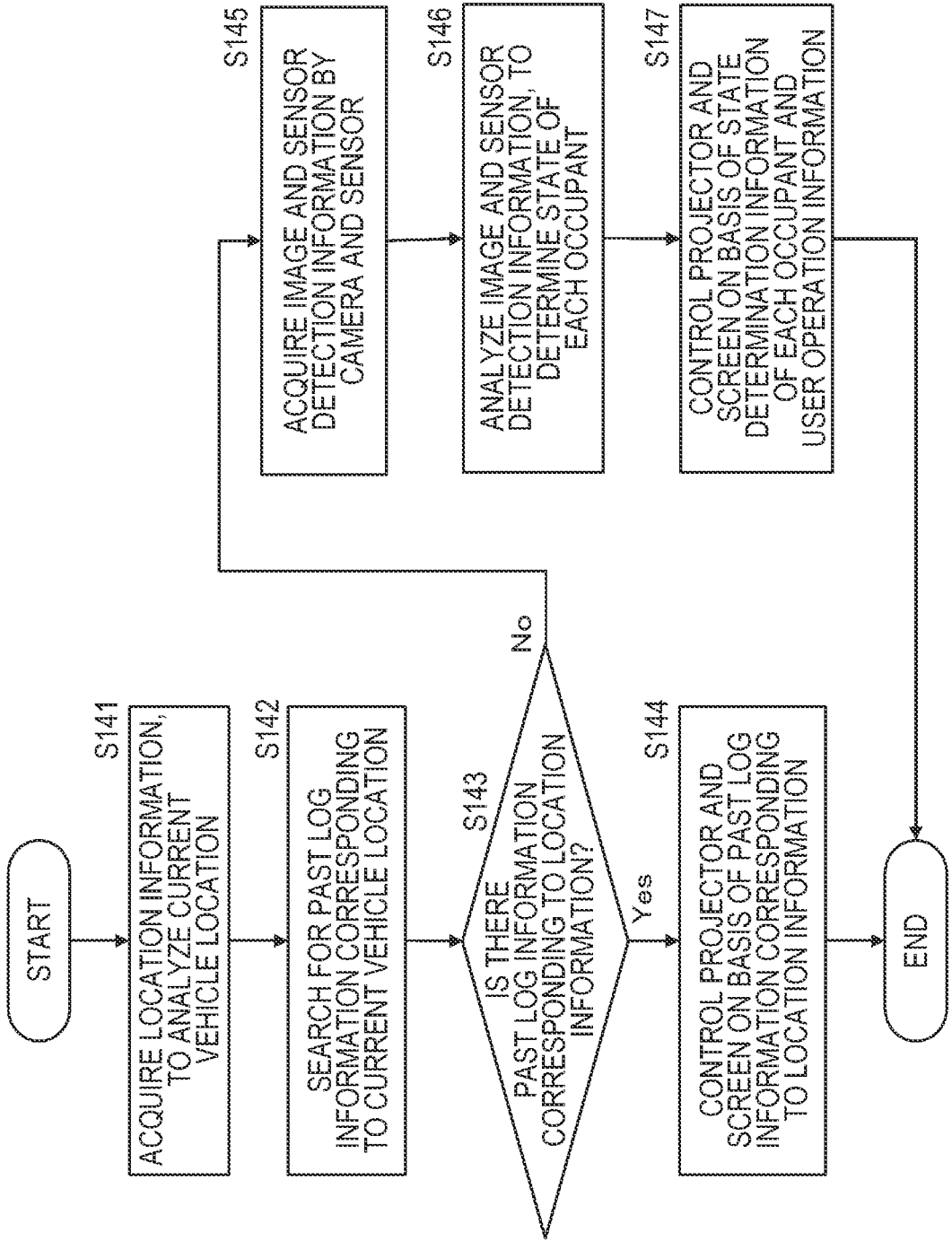

The flow illustrated in FIG. 19 is a sequence in which the control processing illustrated in FIG. 18 to which the past log information is applied and the control processing based on an action or a state of an occupant described above with reference to FIG. 14 are executed together, but the control processing to which the past log information is applied is performed first.

Without limiting to such a processing sequence, a configuration may be adopted in which processing is performed in a sequence in which, for example, the processing of steps S145 to S147 illustrated in FIG. 19, that is, the control processing based on an action or a state of an occupant described with reference to FIG. 14 is executed first, and the control processing illustrated in FIG. 18 to which the past log information is applied is performed in a case where the control mode based on the action or the state of the occupant cannot be determined.

[6. Hardware Configuration Example of Projector Control Apparatus of Present Disclosure]

Next, a specific hardware configuration example of the projector control apparatus of the present disclosure will be described.

FIG. 20 is a diagram illustrating a specific hardware configuration of the projector control apparatus of the present disclosure.

Components of the hardware configuration illustrated in FIG. 20 will be described.

A central processing unit (CPU) 301 functions as a data processing unit configured to execute various kinds of processing in accordance with a program stored in a read only memory (ROM) 302 or a storage unit 308. For example, the processing according to the sequence described in the above-described embodiment is executed. A random access memory (RAM) 303 stores a program executed by the CPU 301 and data. These CPU 301, ROM 302, and RAM 303 are connected to each other by a bus 304.

The CPU 301 is connected to an input/output interface 305 via the bus 304, and the input/output interface 305 is connected with an input unit 306 including various switches, a keyboard, a touch panel, a mouse, a microphone, a camera, and the like, and an output unit 307 including a display, a speaker, and the like.

Note that the output unit 307 includes a projector and a screen.

The CPU 301 inputs commands, status data, and the like inputted from the input unit 306, executes various kinds of processing, and outputs processing results to, for example, the output unit 307.

The storage unit 308 connected to the input/output interface 305 includes, for example, a hard disk or the like, and stores a program executed by the CPU 301 and various data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes data recording and reading.

[7. Summary of Configuration of Present Disclosure]

The embodiment of the present disclosure has been described in detail with reference to the specific embodiment. However, it is obvious that those skilled in the art can make modifications and substitutions of the embodiment without departing from the scope of the present disclosure. In other words, the present invention has been disclosed in the form of exemplification, and should not be construed as limiting. In order to determine the scope of the present disclosure, the section of the claims should be taken into consideration.

Note that the technology disclosed in this specification can have the following configurations.

(1) A projector control apparatus including:
 a data processing unit configured to execute state analysis of an occupant of a vehicle and execute output control of a projector in accordance with an occupant analysis result, in which
 the data processing unit
 performs projector control of outputting illumination light having luminance determined in accordance with the occupant analysis result, in units of a sectioned area of a screen of a vehicle ceiling on which projector output light is outputted.

(2) The projector control apparatus according to (1), in which
 the data processing unit
 outputs illumination light having luminance determined in accordance with an occupant state, in units of a screen sectioned area above each occupant.

(3) The projector control apparatus according to (1) or (2), in which
 the data processing unit
 analyzes a state of an occupant on the basis of a camera-captured image of an occupant.

(4) The projector control apparatus according to any one of (1) to (3), in which
 the data processing unit
 performs setting of an output range of projector output light and setting of a sectioned area of the screen, in accordance with an occupant position measured by a distance sensor.

(5) The projector control apparatus according to any one of (1) to (4), in which
 the data processing unit
 performs, in a case where an occupant is sleeping, projector control to set a screen sectioned area above the occupant who is sleeping, to low-luminance illumination output or illumination stop.

(6) The projector control apparatus according to any one of (1) to (5), in which
 the data processing unit
 performs, in a case where an occupant is not sleeping, projector control to set a screen sectioned area above the occupant who is not sleeping, to high-luminance illumination output.

(7) The projector control apparatus according to any one of (1) to (6), in which
 the data processing unit
 performs image output or illumination output with luminance determined in accordance with an occupant state, in units of a screen sectioned area above an occupant.

(8) The projector control apparatus according to any one of (1) to (7), in which
 the data processing unit
 outputs, in a case where an occupant is looking at a screen above, an image to a screen sectioned area above the occupant who is looking at the screen.

(9) The projector control apparatus according to any one of (1) to (8), in which
 the data processing unit
 performs screen control for adjusting a screen characteristic determined in accordance with the occupant analysis result, in units of a sectioned area of a screen of a vehicle ceiling on which projector output light is outputted.

(10) The projector control apparatus according to (9), in which the screen is a dynamic functional screen capable of adjustment of a screen characteristic.

(11) The projector control apparatus according to any one of (1) to (10), in which
 the data processing unit
 refers to past log information in which projector setting information associated with location information is recorded, and acquires projector setting information recorded in past log information having location information same as or close to a current location of a vehicle, and
 performs projector control of adjusting to a same setting as the projector setting information acquired from the past log information.

(12) The projector control apparatus according to (11), in which
 the past log information is
 information recorded in a storage unit of the projector control apparatus or in an external server.

(13) The projector control apparatus according to any one of (1) to (12), in which
 the data processing unit
 executes user identification of an occupant on the basis of a camera-captured image of the occupant,
 acquires projector setting information associated with an identified user from past log information in which projector setting information for each user is recorded, and
 performs projector control of adjusting to a same setting as the projector setting information corresponding to the user and acquired from the past log information.

(14) A projector control method executed in a projector control apparatus, the projector control method including,
by a data processing unit:
an occupant state analysis step of executing state analysis of an occupant of a vehicle; and
a projector control step of executing output control of a projector in accordance with an occupant analysis result, in which
in the projector control step,
projector control of outputting illumination light having luminance determined in accordance with the occupant analysis result is performed in units of a sectioned area of a screen of a vehicle ceiling on which projector output light is outputted.

(15) A program for causing a projector control apparatus to execute projector control, the program causing a data processing unit to execute:
an occupant state analysis step of controlling to execute state analysis of an occupant of a vehicle; and
a projector control step of controlling to execute output control of a projector in accordance with an occupant analysis result, in which
in the projector control step,
projector control of outputting illumination light having luminance determined in accordance with the occupant analysis result is performed in units of a sectioned area of a screen of a vehicle ceiling on which projector output light is outputted.

Furthermore, the series of processes described in the specification can be executed by hardware, software, or a combined configuration of both. In a case of executing processing by software, a program recording a processing sequence can be installed and executed in a memory in a computer incorporated in dedicated hardware, or a program can be installed and executed in a general-purpose computer capable of executing various processes. For example, the program can be recorded in advance on a recording medium. The program can be installed from a recording medium to a computer, or can be received via a network such as a local area network (LAN) or the Internet, and installed in a recording medium such as an incorporated hard disk.

Note that the various processes described in the specification may be executed not only in a chronological order in accordance with the description, but may also be executed in parallel or individually depending on processing capability of a device that executes the processing or depending on the necessity. Furthermore, a system in this specification is a logical set configuration of a plurality of devices, and is not limited to one in which a device of each configuration is in a same casing.

INDUSTRIAL APPLICABILITY

As described above, a configuration of one embodiment of the present disclosure realizes an apparatus and a method for analyzing a state of a vehicle occupant and executing illumination and image output control by a projector in units of a screen sectioned area of a vehicle ceiling, in accordance with an analysis result.

Specifically, for example, there is provided a data processing unit configured to execute state analysis of an occupant of a vehicle and execute output control of a projector in accordance with an occupant analysis result. The data processing unit performs projector control of outputting illumination light having luminance determined in accordance with the occupant analysis result, in units of a sectioned area of a screen of a vehicle ceiling on which projector output light is outputted. The data processing unit analyzes a state of an occupant on the basis of a camera-captured image, and outputs illumination light having luminance determined in accordance with an occupant state, in units of a screen sectioned area above each occupant.

This configuration realizes an apparatus and a method for analyzing a state of a vehicle occupant and executing illumination and image output control by a projector in units of a screen sectioned area of a vehicle ceiling, in accordance with an analysis result.

REFERENCE SIGNS LIST

11 Projector
12 Screen (ceiling)
21 Camera
22 Distance sensor
100 projector control apparatus
101 Camera
102 Distance sensor
103 GPS
104 Data processing unit
105 Storage unit
106 Input unit (operation unit)
107 Communication unit
108 Projector
109 Screen
121 Occupant analysis unit
122 Location analysis unit
123 Control information generation unit
124 Projector control unit
125 Screen control unit
150 Server
301 CPU
302 ROM
303 RAM
304 Bus
305 Input/output interface
306 Input unit
307 Output unit
308 Storage unit
309 Communication unit
310 Drive
311 Removable medium

The invention claimed is:
1. A projector control apparatus, comprising:
a data processing unit configured to:
execute state analysis of an occupant of a vehicle;
refer to past log information in which projector setting information associated with location information of the vehicle is recorded;
acquire the projector setting information recorded in the past log information having location information same as or close to a current location of the vehicle; and
execute output control of a projector in accordance with an occupant analysis result and the acquired projector setting information, wherein
the data processing unit performs the output control of the projector for outputting illumination light having luminance determined in accordance with the occupant analysis result, in units of a sectioned area of a screen of a vehicle ceiling on which projector output light is outputted, and
the data processing unit performs the output control of the projector for adjusting to a same setting as the projector setting information acquired from the past log information.

2. The projector control apparatus according to claim 1, wherein
the data processing unit outputs illumination light having luminance determined in accordance with an occupant state, in units of a screen sectioned area above each occupant.

3. The projector control apparatus according to claim 1, wherein
the data processing unit analyzes a state of an occupant on a basis of a camera-captured image of the occupant.

4. The projector control apparatus according to claim 1, wherein
the data processing unit performs setting of an output range of the projector output light and setting of the sectioned area of the screen, in accordance with an occupant position measured by a distance sensor.

5. The projector control apparatus according to claim 1, wherein
the data processing unit performs, in a case where the occupant is sleeping, projector control to set a screen sectioned area above the occupant who is sleeping, to low-luminance illumination output or illumination stop.

6. The projector control apparatus according to claim 1, wherein
the data processing unit performs, in a case where the occupant is not sleeping, projector control to set a screen sectioned area above the occupant who is not sleeping, to high-luminance illumination output.

7. The projector control apparatus according to claim 1, wherein
the data processing unit performs image output or illumination output with luminance determined in accordance with an occupant state, in units of a screen sectioned area above the occupant.

8. The projector control apparatus according to claim 1, wherein
the data processing unit outputs, in a case where the occupant is looking at a screen above, an image to a screen sectioned area above the occupant who is looking at the screen.

9. The projector control apparatus according to claim 1, wherein
the data processing unit performs screen control for adjusting a screen characteristic determined in accordance with the occupant analysis result, in units of the sectioned area of the screen of the vehicle ceiling on which the projector output light is outputted.

10. The projector control apparatus according to claim 9, wherein the screen includes a dynamic functional screen capable of adjustment of the screen characteristic.

11. The projector control apparatus according to claim 1, wherein
the past log information includes information recorded in a storage unit of the projector control apparatus or in an external server.

12. The projector control apparatus according to claim 1, wherein the data processing unit
executes user identification of the occupant on a basis of a camera-captured image of the occupant,
acquires projector setting information associated with an identified user from the past log information in which the projector setting information for each user is recorded, and
performs projector control of adjusting to a same setting as the projector setting information corresponding to the user and acquired from the past log information.

13. A projector control method executed in a projector control apparatus, the projector control method comprising, by a data processing unit:
executing state analysis of an occupant of a vehicle;
referring to past log information in which projector setting information associated with location information of the vehicle is recorded;
acquiring the projector setting information recorded in the past loq information having location information same as or close to a current location of the vehicle; and
executing output control of a projector in accordance with an occupant analysis result, wherein
the output control of the projector is performed for outputting illumination light having luminance determined in accordance with the occupant analysis result, in units of a sectioned area of a screen of a vehicle ceiling on which projector output light is outputted, and
the output control of the projector is performed for adjusting to a same setting as the projector setting information acquired from the past log information.

14. A non-transitory computer-readable medium having stored thereon, computer-executable instructions which, when executed by a data processing device, cause the data processing device to execute operations, the operations:
executing state analysis of an occupant of a vehicle;
referring to past log information in which projector setting information associated with location information of the vehicle is recorded;
acquiring the projector setting information recorded in the past log information having location information same as or close to a current location of the vehicle; and
executing output control of a projector in accordance with an occupant analysis result, wherein
the output control of the projector is performed for outputting illumination light having luminance determined in accordance with the occupant analysis result, in units of a sectioned area of a screen of a vehicle ceiling on which projector output light is outputted, and
the output control of the projector is performed for adjusting to a same setting as the projector setting information acquired from the past loq information.

* * * * *